(12) United States Patent
Baba et al.

(10) Patent No.: US 6,278,755 B1
(45) Date of Patent: Aug. 21, 2001

(54) BIT SYNCHRONIZATION CIRCUIT

(75) Inventors: Mitsuo Baba; Yasushi Aoki; Minoru Kayano; Yuuji Takahashi; Atsushi Katayama, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/567,072

(22) Filed: May 8, 2000

(30) Foreign Application Priority Data

May 18, 1999 (JP) .................................................. 11-136675

(51) Int. Cl.[7] .................................................... H04L 7/00
(52) U.S. Cl. ........................ 375/360; 375/354; 375/373; 370/503; 327/141
(58) Field of Search ...................................... 375/354, 371, 375/373, 360; 370/503; 327/141, 144

(56) References Cited

U.S. PATENT DOCUMENTS

| 5,022,057 | * | 6/1991 | Nishi et al. ........................... 375/373 |
| 5,909,473 | * | 6/1999 | Aoki et al. ........................... 375/373 |
| 6,002,731 | * | 12/1999 | Aoki et al. ........................... 375/371 |

FOREIGN PATENT DOCUMENTS

| 56-104557 | 8/1981 | (JP) . |
| 728277 | 3/1995 | (JP) . |
| 10271101 | 10/1998 | (JP) . |

\* cited by examiner

*Primary Examiner*—Temesghen Ghebretinsae
(74) *Attorney, Agent, or Firm*—Ostrolenk, Faber, Gerb & Soffen, LLP

(57) ABSTRACT

A bit synchronization circuit extracts the central phase of an eye opening irrespective of a jitter distribution of input data to maintain an optimum timing adjustment margin. The bit synchronization circuit has a data edge detector for comparing the phases of an edge of the input data and m-phase clock signals divided from a reference clock. Data edge phase information from the data edge detector is accumulated by a phase accumulation register, which stores the jitter distribution of the input data as accumulated phase information. Based on the accumulated phase information, an eye center phase calculator decodes the negative and positive ends of a jitter range as negative jitter range information and positive jitter range information, and calculates a phase control direction in relation to an extracted phase value which represents a presently selected clock phase. A correction circuit extracts the positional relationship between a present eye opening width and the extracted phase value, and clears the accumulated phase information to increase the eye opening width.

21 Claims, 11 Drawing Sheets

BIT SYNCHRONIZATION CIRCUIT

BACKGROUND OF THE INVENTION

1. Field of the Invention

The present invention relates to a bit synchronization circuit, and more particularly to a bit synchronization circuit for automatically adjusting the timing of input data having jitter.

2. Description of the Related Art

In the art of digital signal transmission, it is customary to generate a higher-level digital signal by multiplexing a plurality of lower-level digital signals in a transmitting station, send the higher-level digital signal from the transmitting station via a transmission link to a receiving station, and demultiplex the higher-level digital signal back into a plurality of lower-level digital signals in a receiving station. In order for the receiving station to recognize the received data correctly, it is necessary that the transmitting and receiving stations be synchronized with each other. Conventional bit synchronization circuits attempt to synchronize the transmitting and receiving stations with each other by automatically adjusting the timing of the received data.

FIG. 1 of the accompanying drawings schematically shows a conventional bit synchronization circuit which has been proposed heretofore. In the conventional bit synchronization circuit shown in FIG. 1, a reference clock signal 10 is supplied to a multiphase clock generator 11, which generates m-phase clock signals 12 that are out of phase with each other. The m-phase clock signals 12 are applied to a clock selection circuit 13 and a selector 14. The selector 14 outputs a clock signal 16 which is alternatively selected from the m-phase clock signals 12 based on a clock selection signal 15 generated by the clock selection circuit 13. Burst input data 17 is supplied to a data input (D) terminal of a D-type flip-flop (hereinafter referred to as "D-FF") 18 and the clock selection circuit 13. The clock signal 16 is applied to a clock input (C) terminal of the D-FF 18. In synchronism with a falling edge of the clock signal 16, the D-FF 18 latches the burst input data 17, and outputs a timing adjustment signal 19 from a data output (Q) terminal thereof.

The clock selection circuit 13 comprises a phase comparator 20, a decoder 21, a phase adjuster 22, and a selection clock counter 23. The phase comparator 20 has a D terminal supplied with the m-phase clock signals 12 and a C terminal supplied with the burst input data 17. The phase comparator 20 compares the phases of the m-phase clock signals 12 and the burst input data 17 with each other, and outputs phase difference information with respect to each of the m-phase clock signals 12 from the Q terminal.

The decoder 21 converts the phase difference information supplied from the phase comparator 20 into a clock name representative of an optimum clock phase corresponding to an edge of the input data 17. The phase adjuster 22 generates phase transition information to be controlled depending on the phase difference between the clock selection signal 15 indicative of the presently selected clock phase and the optimum clock phase at the edge of the input data 17. The generated phase transition information is supplied from the phase adjuster 22 to a count-up/down input (U/D) terminal of the selection clock counter 23. The selection clock counter 23 has a C terminal supplied with the burst input data 17, an initial value input (A) terminal supplied with selected clock information 25 from a clock phase holder 24, and a load input (L) terminal supplied with an initial value input signal from a memory controller 26. When the initial value input signal is of a logic level "H", the selection clock counter 23 outputs, from a Q terminal thereof, a clock selection signal which represents the selected clock information entered from the A terminal. While the burst input data 17 is being applied to the bit synchronization circuit, the clock phase holder 24 is supplied with the clock selection signal 15 indicating the presently selected clock phase, and applies the selected clock information 25 indicating the clock selected immediately before the burst input data 17 is applied, to the A terminal of the selection clock counter 23. The clock phase holder 24 is controlled by the memory controller 26.

The bit synchronization circuit shown in FIG. 1 operates as follows: When the reference clock signal 10 is supplied to the multiphase clock generator 11, the multiphase clock generator 11 generates and supplies m-phase clock signals 12 to the clock selection circuit 13 and the selector 14. In the clock selection circuit 13, the phase comparator 20 compares the phases of each of the m-phase clock signals 12 and the burst input data 17 with each other, and supplies phase difference information to the decoder 21. The decoder 21 converts the phase difference information into a clock name representative of an optimum clock signal to be selected among the m-phase clock signals 12 depending on the phase status of the present input data 17. The phase adjuster 22 generates phase transition information to be controlled between the clock name and the clock selection signal 15 indicating the presently selected clock signal. For example, if the clock signal to be selected is to remain as it is, then the phase adjuster 22 generates phase transition information representing "0". If the clock signal to be selected is to be shifted by a phase corresponding to "+1", then the phase adjuster 22 generates phase transition information representing "+", and if the clock signal to be selected is to be shifted by a phase corresponding to "−1", then the phase adjuster 22 generates phase transition information representing "−".

The selection clock counter 23 generates a counted-up clock selection signal 15 in synchronism with the input data 17 when the phase transition information is "+", a counted-down clock selection signal 15 in synchronism with the input data 17 when the phase transition information is "−", and a clock selection signal 15, which remains unchanged, in synchronism with the input data 17 when the phase transition information is "0". A clock signal represented by the clock selection signal 15 is applied to the selector 14. Based on the clock selection signal 15, the selector 14 outputs a clock signal 16 alternatively selected from the m-phase clock signals 12. The input data 17 is adjusted in timing by the D-FF 18 in synchronism with a falling edge of the selected clock signal 16, and outputted as a timing-adjusted signal 19 from the D-FF 18. A clock signal which is optimum for the previous period is held as an initial value by the clock phase holder 24. Based on the initial clock signal held by the clock phase holder 24, the selection clock counter 23 is initialized at a predetermined timing by the memory control circuit 26. Therefore, even when bit synchronization is required due to a reduction in the transmission link error rate, such bit synchronization can quickly be completed.

Details of the above bit synchronization circuit are disclosed in Japanese laid-open patent publication No. 10-271101 entitled "Timing synchronization circuit", for example.

Japanese laid-open patent publication No. 56-104557 discloses a bit synchronization circuit in which a delayed clock produced by delaying an edge of edge information of a string of two-phase-modulated bit data appropriately from an edge of input data is added to the input data, and the phase is compared by a mask circuit. With the disclosed arrangement, even if the edge information is lost due to a transmission error of the input data, an edge of the delayed clock can be used instead of the edge of the input data that is lost.

Japanese patent publication No. 7-28277 shows a bit synchronization circuit in which differential frequency information is generated based on an error signal produced by comparing the phase of burst input data and the phase a reference clock signal with each other, and the generated differential frequency information and the error signal are accumulated. The differential frequency information and the error signal which are accumulated are combined to variably control the frequency-division ratio of a variable frequency divider, so that even when no input data is supplied, bit synchronization can be controlled based on preceding burst input data. Furthermore, in an initial stage of the input data, the phase difference for bit synchronization is not increased, allowing bit synchronization to be controlled stably.

In the conventional bit synchronization circuits proposed based on the disclosure of Japanese laid-open patent publication No. 10-271101 and Japanese laid-open patent publication No. 56-104557, the phase of an edge of the input data and the phase of the presently selected clock signal are compared with each other, and the phase of a next clock signal is selected depending on the phase difference. Specifically, the clock phase corresponding to the edge phase of the present input data is extracted, and the timing of next input data is adjusted with a clock signal which has the extracted clock phase. Therefore, when the phase of an edge of the present input data and the phase of an edge of the next input data differ from each other owing to a jitter distribution in the input data, a margin available for adjusting the timing of the next input data is greatly reduced, resulting in a higher data error probability. According to the disclosure of Japanese patent publication No. 7-28277, the differential frequency information and the error signal are accumulated simply to avoid an increase in the phase difference through the phase comparison with hypothetical input data in the absence of input data. Consequently, if the input data itself has a jitter distribution, then when the phase of an edge of the present input data and the phase of an edge of the next input data differ from each other, a margin available for adjusting the timing of the next input data is greatly reduced.

As described above, the conventional bit synchronization circuits process the phase of an edge of the input data and the present clock phase to determine a next clock phase. However, the conventional bit synchronization circuits fail to adjust the timing of input data independently of a jitter distribution in the input data. Ideally, the timing of the input data is required to be adjusted in timed relation to the phase of the center of an opening of an eye pattern (hereinafter referred to as "eye").

SUMMARY OF THE INVENTION

It is therefore an object of the present invention to provide a bit synchronization circuit for extracting the phase of the center of an eye opening independently of a jitter distribution in input data for thereby achieving an optimum margin for input data timing adjustment.

According to an aspect of the present invention, there is provided a bit synchronization circuit comprising clock generating means for generating a plurality of clocks having respective different phases from a reference clock, clock selecting means for alternatively selecting one of the plurality of clocks based on an extracted phase value indicative of either one of the phases, latch means for latching input data with the clock selected by the clock selecting means, edge detecting means for detecting an edge of the input data, storage means for storing accumulated edges detected by the edge detecting means as phase information, jitter range detecting means for detecting positive and negative ends of a jitter range from the phase information accumulatively stored by the storage means, center phase calculating means for calculating a central phase of an eye pattern from the positive and negative ends of the jitter range which have been detected by the jitter range detecting means, and extracted phase value updating means for updating the extracted phase value depending on a result of comparison of the central phase of the eye pattern calculated by the center phase calculating means and the extracted phase value at the time the central phase of the eye pattern is calculated.

The input data is latched for bit synchronization by a clock selected alternatively by the clock selecting means from the plurality of clocks generated out of phase with each other by the clock generating means based on the reference clock. The storage means stores accumulated edges detected by the edge detecting means as phase information, and the jitter range detecting means detects positive and negative ends of a jitter range from the phase information accumulatively stored by the storage means. The center phase calculating means calculates a central phase of an eye pattern from the positive and negative ends of the jitter range which have been detected by the jitter range detecting means, and the extracted phase value updating means compares the central phase of the eye pattern and the extracted phase value at the present time, and updates the extracted phase value into an optimum extracted phase value. Based on the updated extracted phase value, the clock selecting means selects an optimum clock for maintaining a sufficient timing adjustment margin.

According to another aspect of the present invention, there is also provided a bit synchronization circuit comprising clock generating means for generating a plurality of clocks having respective different phases from a reference clock, clock selecting means for alternatively selecting one of the plurality of clocks based on an extracted phase value indicative of either one of the phases, latch means for latching input data with the clock selected by the clock selecting means, edge detecting means for detecting an edge of the input data, storage means for storing accumulated edges detected by the edge detecting means as phase information, jitter range detecting means for detecting positive and negative ends of a jitter range from the phase information accumulatively stored by the storage means, first calculating means for calculating a first width between the positive end detected by the jitter range detecting means and the extracted phase value, second calculating means for calculating a second width between the negative end detected by the jitter range detecting means and the extracted phase value, and extracted phase value updating means for updating the extracted phase value depending on a result of comparison of the first and second widths calculated respectively by the first and second calculating means.

The input data is latched for bit synchronization by a clock selected alternatively by the clock selecting means from the plurality of clocks generated out of phase with each other by the clock generating means based on the reference clock. The storage means stores accumulated edges detected by the edge detecting means as phase information, and the jitter range detecting means detects positive and negative ends of a jitter range from the phase information accumulatively stored by the storage means. The first calculating means calculates a first width between the positive end detected by the jitter range detecting means and the extracted phase value. The second calculating means calculates a second width between the negative end detected by the jitter range detecting means and the extracted phase value. The extracted phase value updating means compares the first and second widths to determine whether the central phase of an eye pattern at the time is positive or negative with respect to the extracted phase value at the present time, and updates the extracted phase value depending on the determined result. Based on the updated extracted phase value, the clock selecting means selects an optimum clock for maintaining a sufficient timing adjustment margin.

The bit synchronization circuit further comprises first comparing means for comparing the first width calculated by the first calculating means with a predetermined first setting value, second comparing means for comparing the second width calculated by the second calculating means with a predetermined second setting value, and correction signal generating means for generating a correction signal for clearing the negative end of the jitter range if the first width is smaller than the predetermined first setting value and clearing the positive end of the jitter range if the second width is smaller than the predetermined second setting value, the storage means comprising means for clearing an edge of the phase information corresponding to the correction signal generated by the correction signal generating means.

The first comparing means compares the first width calculated by the first calculating means with a predetermined first setting value, and the second comparing means compares the second width calculated by the second calculating means with a predetermined second setting value. The correction signal generating means generates a correction signal for clearing the negative end of the jitter range if the first width is smaller than the predetermined first setting value and clearing the positive end of the jitter range if the second width is smaller than the predetermined second setting value. The storage means clears an edge of the phase information corresponding to the correction signal generated by the correction signal generating means, for thereby increasing the opening width of the eye pattern. Since the phase information corresponding to the negative or positive end of the jitter range is cleared when the opening width of the eye pattern becomes smaller than a preset width, an undetermined phase value at the time the power supply is turned on can be cleared, and a timing adjustment clock can be extracted in a manner to follow wanderings of the input data.

The bit synchronization circuit further comprises edge converting means for generating a both-edge phase signal which represents rising and falling edges of the input data as converted into either one of the rising and falling edges, the arrangement being such that the edge detecting means, the storage means, and the extracted phase value updating means are synchronized with the both-edge phase signal generated by the edge converting means.

The edge converting means generates a both-edge phase signal which represents rising and falling edges of the input data as converted into either one of the rising and falling edges. The edge detecting means, the storage means, and the extracted phase value updating means are synchronized with the both-edge phase signal generated by the edge converting means. Therefore, even when the phases of rising and falling edges suffer variations, it is possible to extract phases taking into account the phase information of both rising and fall edges. It is therefore possible to extract an optimum timing adjustment clock even when the duty ratio of the input data is degraded.

The edge detecting means comprises means for detecting an edge of the input data when each of the phases is of a logic level "H" and an adjacent phase is of a logic level "L" in synchronism with the both-edge phase signal.

The edge detecting means detects an edge of the input data when adjacent two phases are of logic levels "H", "L" in synchronism with the both-edge phase signal. Thus, the phase of an edge of the input data can be identified highly quickly with a simple arrangement.

The phases are identifiable by predetermined phase region numbers divided in a predetermined period.

The detected phase information, the negative and positive ends of the jitter range, the opening width of the eye pattern, and the extracted phase value can be represented by the phases which are identified by the predetermined phase region numbers divided in a predetermined period. The various calculating means can thus be simplified.

The extracted phase value updating means comprises center phase information generating means for generating center phase information indicative of phase control in a negative direction if the first width is greater than the second width and indicative of phase control in a negative direction if the first width is smaller than the second width, and extracted phase value counting means for counting down the extracted phase value if the center phase information generated by the center phase information generating means is indicative of phase control in the negative direction, and counting up the extracted phase value if the center phase information generated by the center phase information generating means is indicative of phase control in the positive direction.

The center phase information generating means determines the relationship between the central phase of the eye pattern and the extracted phase value at the present time depending on the relationship of the magnitudes of the first and second widths, for thereby calculating a direction to control the extracted phase value. Consequently, the extracted phase value updating means for updating the extracted phase value for selecting an optimum timing adjustment clock can be simplified.

According to the present invention, as described above, since the phases of edges of the input data from the past to the present are accumulated as a jitter distribution, it is possible to extract the central phase of an eye opening can be extracted irrespective of the jitter distribution to maintain a uniform timing adjustment margin.

In addition, because widths on both sides of the opening width of the eye pattern are calculated from the extracted phase at the present time, an optimum timing adjustment clock can be generated by a simple and high-speed circuit.

Since the phase information corresponding to the negative or positive end of the jitter range is cleared when the opening width of the eye pattern becomes smaller than a preset width, an undetermined phase value at the time the power supply is turned on can be cleared, and a timing adjustment clock can be extracted in a manner to follow wanderings of the input data.

Even when the phases of rising and falling edges suffer variations, it is possible to extract phases taking into account the phase information of both rising and fall edges. It is therefore possible to extract an optimum timing adjustment clock even when the duty ratio of the input data is degraded.

Inasmuch as the edge detecting means detects an edge of the input data when adjacent two phases are of logic levels "H", "L" in synchronism with the both-edge phase signal, the phase of an edge of the input data can be identified highly quickly with a simple arrangement.

The detected phase information, the negative and positive ends of the jitter range, the opening width of the eye pattern, and the extracted phase value can be represented by the phases which are identified by the predetermined phase region numbers divided in a predetermined period. The various calculating means can thus be simplified.

The center phase information generating means determines the relationship between the central phase of the eye pattern and the extracted phase value at the present time depending on the relationship of the magnitudes of the first and second widths, for thereby calculating a direction to control the extracted phase value. Consequently, the extracted phase value updating means for updating the extracted phase value for selecting an optimum timing adjustment clock can be simplified.

The above and other objects, features, and advantages of the present invention will become apparent from the following description with reference to the accompanying drawings which illustrate an example of the present invention.

DESCRIPTION OF THE PREFERRED EMBODIMENT

Figure 1:
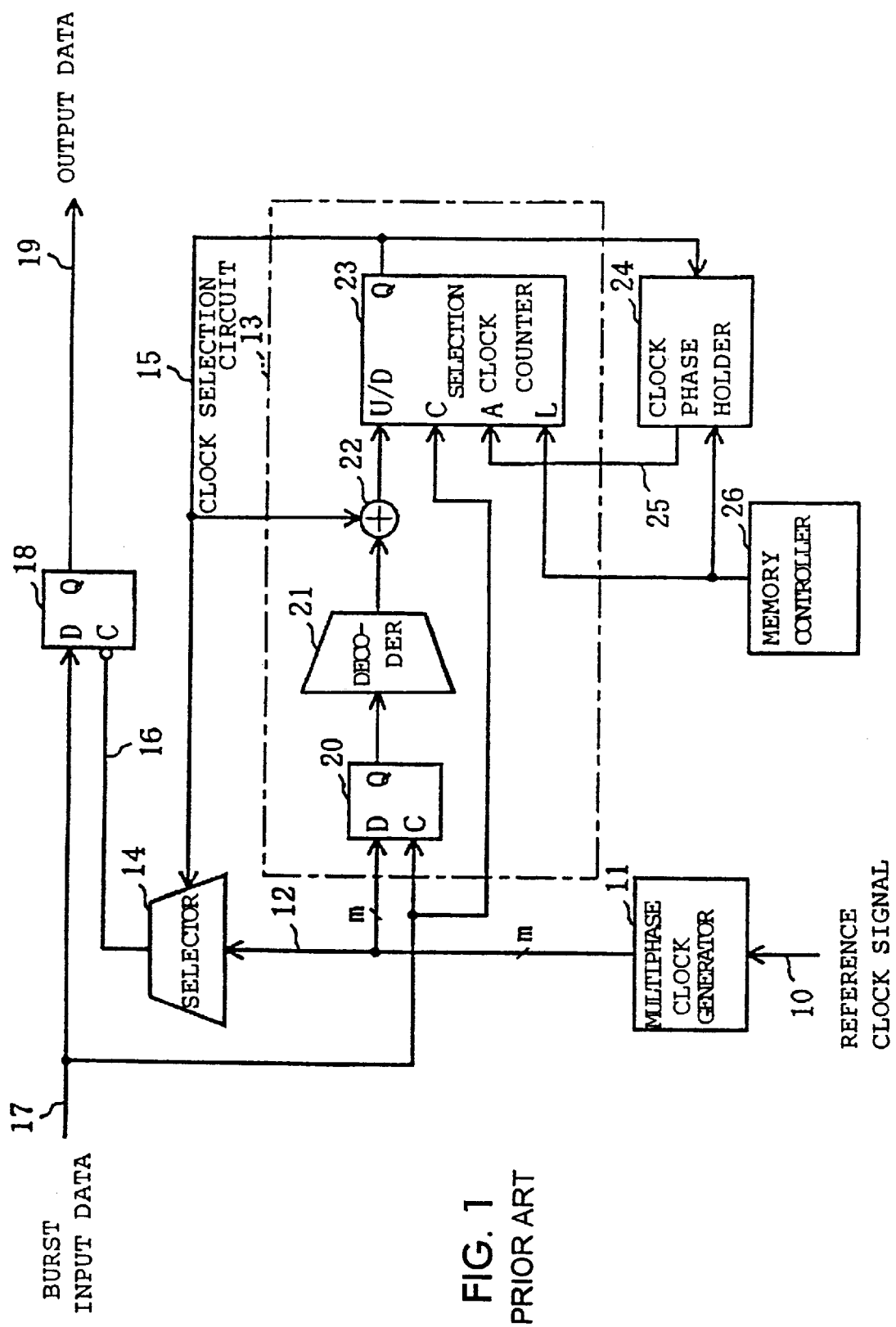
FIG. 1 is a block diagram of a conventional bit synchronization circuit.
Figure 2:
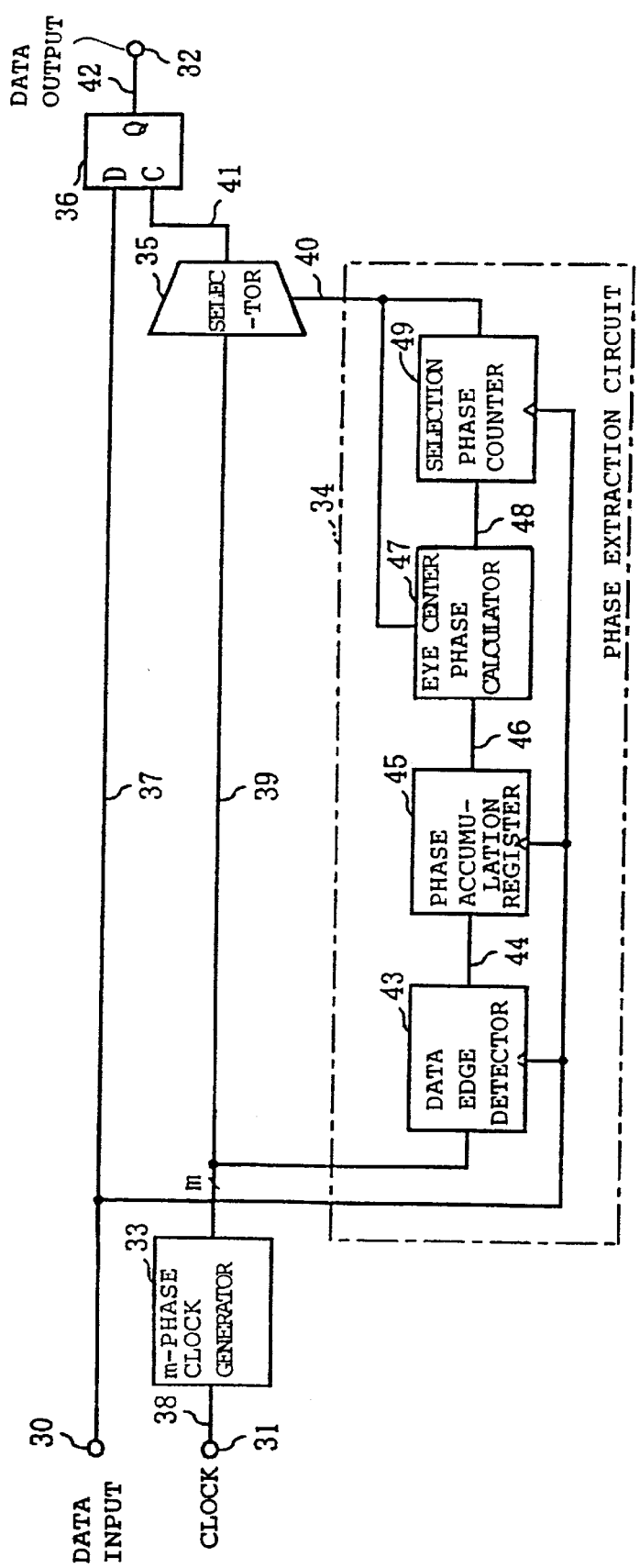
FIG. 2 is a block diagram of a bit synchronization circuit according to the present invention.

FIG. 2 shows in block form a bit synchronization circuit according to the present invention. As shown in FIG. 2, the bit synchronization circuit according to the present invention has a data input terminal 30, a clock input terminal 31, and a data output terminal 32. The bit synchronization circuit comprises an m-phase clock generator 33 (m is an integer of 2 or more), a phase extraction circuit 34, an m-input, 1-output selector 35, and a D-FF 36.

Input data 37 supplied from the data input terminal 30 is supplied to the phase extraction circuit 34 and the D-FF 36. The input data 37 is applied to a D terminal of the D-FF 36. A reference clock 38 supplied from the clock input terminal 31 is applied to the m-phase clock generator 33. The m-phase clock generator 33 has a plurality of delay circuits which are combined to generate m-phase clock signals 39 that have the same frequency as the reference clock 38 and are out of phase with each other by 360/m. The m-phase clock signals 39 generated by the m-phase clock generator 33 are supplied to the phase extraction circuit 34 and the selector 35. The selector 35 is also supplied with an extracted phase value 40 from the phase extraction circuit 34, and alternatively selects an extracted clock 41 from the m-phase clock signals 39 based on the extracted phase value 40. The extracted clock 41 is applied to a C terminal of the D-FF 36. In synchronism with the extracted clock 41 supplied from the C terminal, the D-FF 36 latches the input data 37 supplied from the D terminal and outputs timing-adjusted data 42 from its Q terminal. The timing-adjusted data 42 is outputted from the data output terminal 32.

The phase extraction circuit 34 is arranged to be able to detect which phase of the m-phase clock signals 39 generated by the m-phase clock generator 33 the phase of an edge of the input data 37 agrees with. Based on the detected phase, the phase extraction circuit 34 calculates an optimum timing adjustment phase, and generates the extracted phase value 40 corresponding to the optimum timing adjustment phase. The extracted phase value 40 represents clock selection information indicative of which one of the m-phase clock signals 39 is to be selected. The phase extraction circuit 34 has a data edge detector 43 for comparing the phases of the m-phase clock signals 39 and the phase of the input data 37 with each other. Specifically, the data edge detector 43 detects which one of m phase regions divided from one period of the input data 37 the input data 37 is in, and outputs data edge phase information 44 for the respective phase regions corresponding to the m-phase clock signals 39. The data edge phase information 44 is supplied to a phase accumulation register 45. The phase accumulation register 45 stores the data edge phase information 44 in synchronism with edges of the input data 37, accumulate data edge phase information from the past to the present, and output the accumulated data edge phase information as accumulated phase information 46 to an eye center phase calculator 47. The eye center phase calculator 47 calculates the phase of the center of an eye (eye center phase) based on the extracted phase value 40 indicative of the presently selected clock phase and the accumulated phase information 46, generates eye center phase information 48 indicative of whether the calculated eye center phase is positive or negative with respect to a phase region corresponding to the present extracted phase value 40. The eye center phase information 48 is applied to a selection phase counter 49. Depending on the eye center phase information 48, the selection phase counter 49 counts up or down an extracted phase value corresponding to the presently selected clock signal in synchronism with the edges of the input data 37. The count from the selection phase counter 49 is outputted as the extracted phase value 40 from the phase extraction circuit 34.

In the bit synchronization circuit according to the present invention, as described above, the compared results of the phases of the m-phase clock signals 39 and the input data 37 are accumulated by the phase accumulation register 45, and the eye center phase is calculated from the accumulated phase information by the eye center phase calculator 47. The eye center phase calculator 47 detects whether the calculated eye center phase is to be controlled positively or negatively with respect to the presently selected clock signal, and the selection phase counter 49 updates, i.e., counts up or down, the extracted phase value. In this manner, the timing of the input data can optimally be adjusted according to the timing of the eye center phase extracted from the input data 37.

Figure 3:
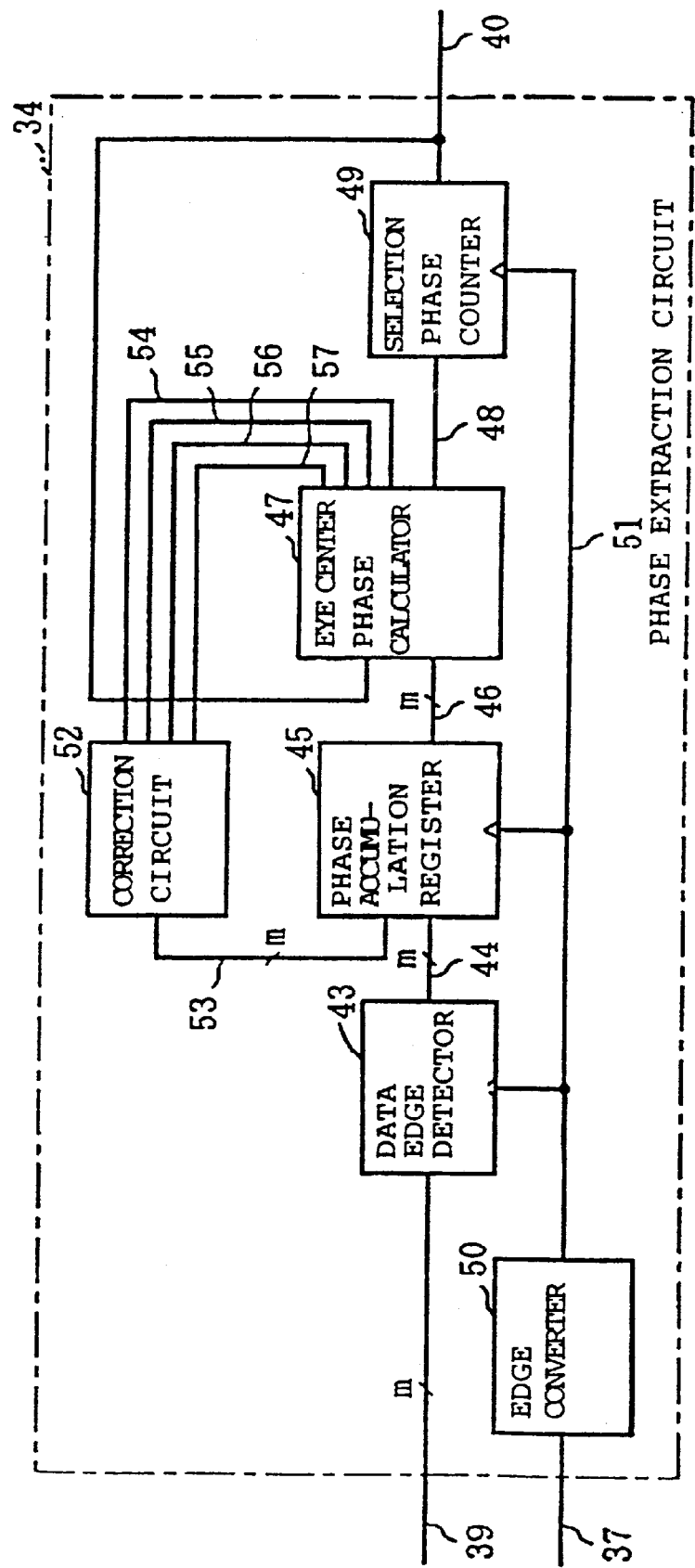
FIG. 3 is a block diagram of a phase extraction circuit in the bit synchronization circuit according to the present invention.

Components of the phase extraction circuit 34 capable of such optimum timing adjustment will be described below. FIG. 3 shows in block form the phase extraction circuit 34 in the bit synchronization circuit according to the present invention. Those parts in FIG. 3 which are identical to those in the bit synchronization circuit shown in FIG. 2 are denoted by identical reference numerals, and will not be described in detail below. As shown in FIG. 3, the phase extraction circuit 34 has an edge converter 50 for generating a both-edge phase signal 51 in synchronism with both rising and falling edges of the input data 37. The phase extraction circuit 34 also has a correction circuit 52 for generating a correction signal 53 to clear an indicated register in the phase accumulation register 45 depending on the width of an eye opening calculated by the eye center phase calculator 47. In the phase extraction circuit 34 with the edge converter 50 and the correction circuit 52 added thereto, the m-phase clock signals 39 are supplied to the data edge detector 43. The edge converter 50 is supplied with the input data 37 and generates the both-edge phase signal 51 which represents the phases of both rising and falling edges of the input data 37 with only one of the edges, i.e., the rising edge or the falling edge. The both-edge phase signal 51 is applied to the data edge detector 43, the phase accumulation register 45, and the selection phase counter 49. The data edge detector 43 compares the phases of edges of the both-edge phase signal 51 in synchronism with falling edges of the both-edge phase signal 51, with respect to each of the m-phase clock signals 39, thus comparing the phases of both edges, i.e., rising and falling edges of the input data 37.

The compared result of the phases is supplied as the data edge phase information 44 to the phase accumulation register 45. The phase accumulation register 45 accumulates the data edge phase information 44 in synchronism with rising edges of the both-edge phase signal 51. In the phase accumulation register 45, only a register which accumulates edges corresponding to a phase indicated by the correction signal 53 is cleared. The accumulated phase information 46 generated by the phase accumulation register 45 is supplied to the eye center phase calculator 47. Based on the extracted phase value 40 and the accumulated phase information 46, the eye center phase calculator 47 calculates negative jitter range information 54 indicative of a negative jitter range having a predetermined jitter amplitude, positive jitter range information 55 indicative of a positive jitter range, positive eye opening width information 56 indicative of a positive eye opening width, and negative eye opening width information 57 indicative of a negative eye opening width, and also generates eye center phase information 48 indicative of which side of the extracted phase value 40 the eye center phase is in. The eye center phase information 48 comprises information indicating a phase control direction based on the compared result of the phase of the presently selected clock phase represented by the extracted phase value 40 and the phase of the input data 37. Specifically, phase control directions indicated by the eye center phase information 48 include a "+" direction, a "−" direction, and "0". The eye center phase information 48 indicative of the phase control in the "+" direction serves to select a clock signal which is "+360/m" out of phase with the presently selected extracted phase value 40. The eye center phase information 48 indicative of the phase control in the "−" direction serves to select a clock signal which is "−360/m" out of phase with the presently selected extracted phase value 40. The eye center phase information 48 indicative of "0" serves to keep the selected clock signal unchanged. The eye center phase information 48 indicative of the phase control direction is supplied to the selection phase counter 49. According to the phase control direction represented by the eye center phase information 48, the selection phase counter 49 counts up or down the extracted phase value 40 which indicates the presently selected clock phase.

The negative jitter range information 54, the positive jitter range information 55, the positive eye opening width information 56, and the negative eye opening width information 57 which are generated by the eye center phase calculator 47 are supplied to the correction circuit 52. The correction circuit 52 generates a correction signal 53 for increasing positive or negative jitter in a corresponding range when the eye opening width becomes smaller than a predetermined value, from the negative jitter range information 54, the positive jitter range information 55, the positive eye opening width information 56, and the negative eye opening width information 57.

The components of the phase extraction circuit 34 will be described in further detail below.

Figure 4:
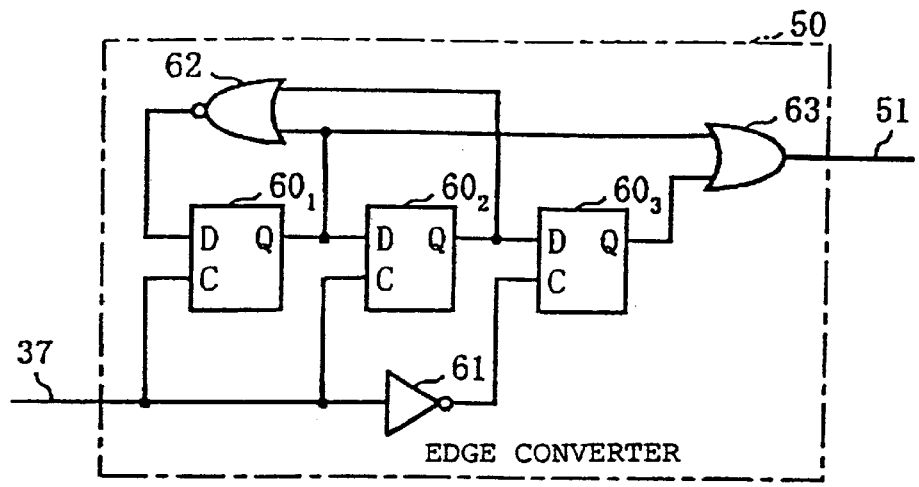
FIG. 4 is a block diagram of an edge converter in the bit synchronization circuit according to the present invention.

FIG. 4 shows in block form the edge converter 50 shown in FIG. 3. Those parts of the phase extraction circuit 34 which are identical to those shown in FIG. 3 are denoted by identical reference numerals, and will not be described in detail below. The edge converter 50 serves to divide the frequency of the input data 37 by 1.5. However, the edge converter 50 may divide the frequency of the input data 37 by 2.5, 3.5, . . . In the edge converter 50, the input data is supplied to C terminals of D-FFs $60_1$, $60_2$ and the input terminal of an inverter (hereinafter referred to as "INV") 61. The INV 61 has an output terminal connected to a C terminal of a D-FF $60_3$. The D-FF $60_1$ has a Q terminal connected to a D terminal of the D-FF $60_2$, an input terminal of a 2-input, 1-output NOR gate 62, and an input terminal of a 2-input, 1-output OR gate 63. The D-FF $60_2$ has a Q terminal connected to a D terminal of the D-FF $60_3$ and the other input terminal of the NOR gate 62. The NOR gate 62 has an output terminal connected to a D terminal of the D-FF $60_1$. The D-FF $60_3$ has a Q terminal connected to the other input terminal of the OR gate 63. The OR gate 63 has an output terminal from which the both-edge phase signal 51 is outputted.

The edge converter 50 frequency-divides the input data 37 using rising and falling edges thereof, and outputs the both-edge phase signal 51 which represents the phase of both edges with one edge.

Figure 5:
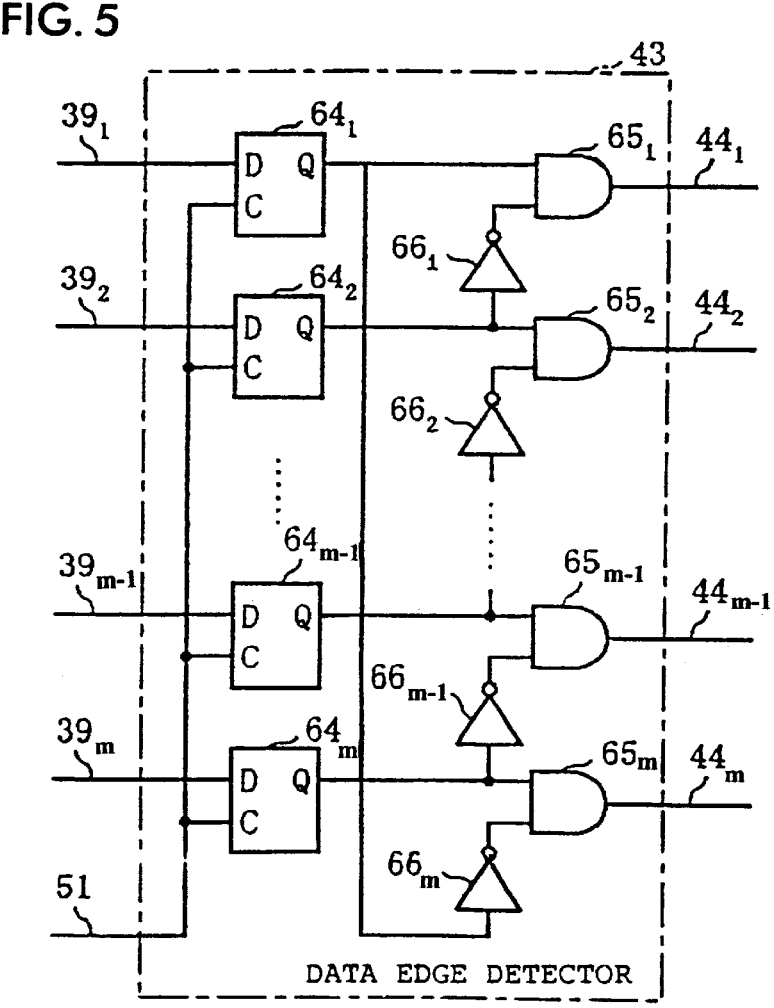
FIG. 5 is a block diagram of a data edge detector in the bit synchronization circuit according to the present invention.

FIG. 5 shows in block form the data edge detector 43 shown in FIG. 3. Those parts of the phase extraction circuit 34 which are identical to those shown in FIG. 3 are denoted by identical reference numerals, and will not be described in detail below. As shown in FIG. 5, m-phase clock signals $39_1$–$39_m$ which are generated out of phase with each other by the m-phase clock generator 33 are supplied respectively to D terminals of D-FFs $64_1$–$64_m$, whose C terminals are supplied with the both-edge phase signal 51 generated by the edge converter 50. The D-FFs $64_1$–$64_m$ latch the respective m-phase clock signals $39_1$–$39_m$ with the both-edge phase signal 51. The D-FFs $64_1$–$64_m$ have respective Q terminals connected to respective input terminals of 2-input, 1-output AND gates $65_1$–$65_m$ and respective input terminals of INVs $66_m$, $66_1$, $66_{m-1}$. The INVs $66_m$, $66_1$, $66_{m-1}$ have respective output terminals connected respectively to the other input terminals of the AND gates $65_1$–$65_m$. The AND gates $65_1$–$65_m$ have respective output terminals for outputting data edge phase information $44_1$–$44_m$. The data edge detector 43 detects a location where latched data between adjacent two phases is "10" with respect to the m-phase clock signals $39_1$–$39_m$ latched at an edge of the input data 37, thereby detecting where is a rising edge of the both-edge phase signal 51 with respect to the phases of rising edges of the m-phase clock signals $39_1$–$39_m$. It indicates that the phase of an edge of the input data 37 is in one of m-phase rigions divided from one period of the input data 37. While the phases of rising edges of the m-phase clock signals $39_1$–$39_m$ have been described above, if it is desired to detect an edge of the both-edge phase signal 51 with respect to the phases of falling edges of the m-phase clock signals $39_1$–$39_m$, then the data edge detector 43 may detect a location where latched data between adjacent two phases is "01".

As described above, the data edge detector 43 generates data edge phase information $44_1$–$44_m$ indicating where rising edges of the both-edge phase signal 51 are located with respect to the phases of rising edges of the m-phase clock signals $39_1$–$39_m$. The data edge phase information $44_1$–$44_m$ is outputted from the data edge detector 43 and applied to the phase accumulation register 45.

Figure 6:
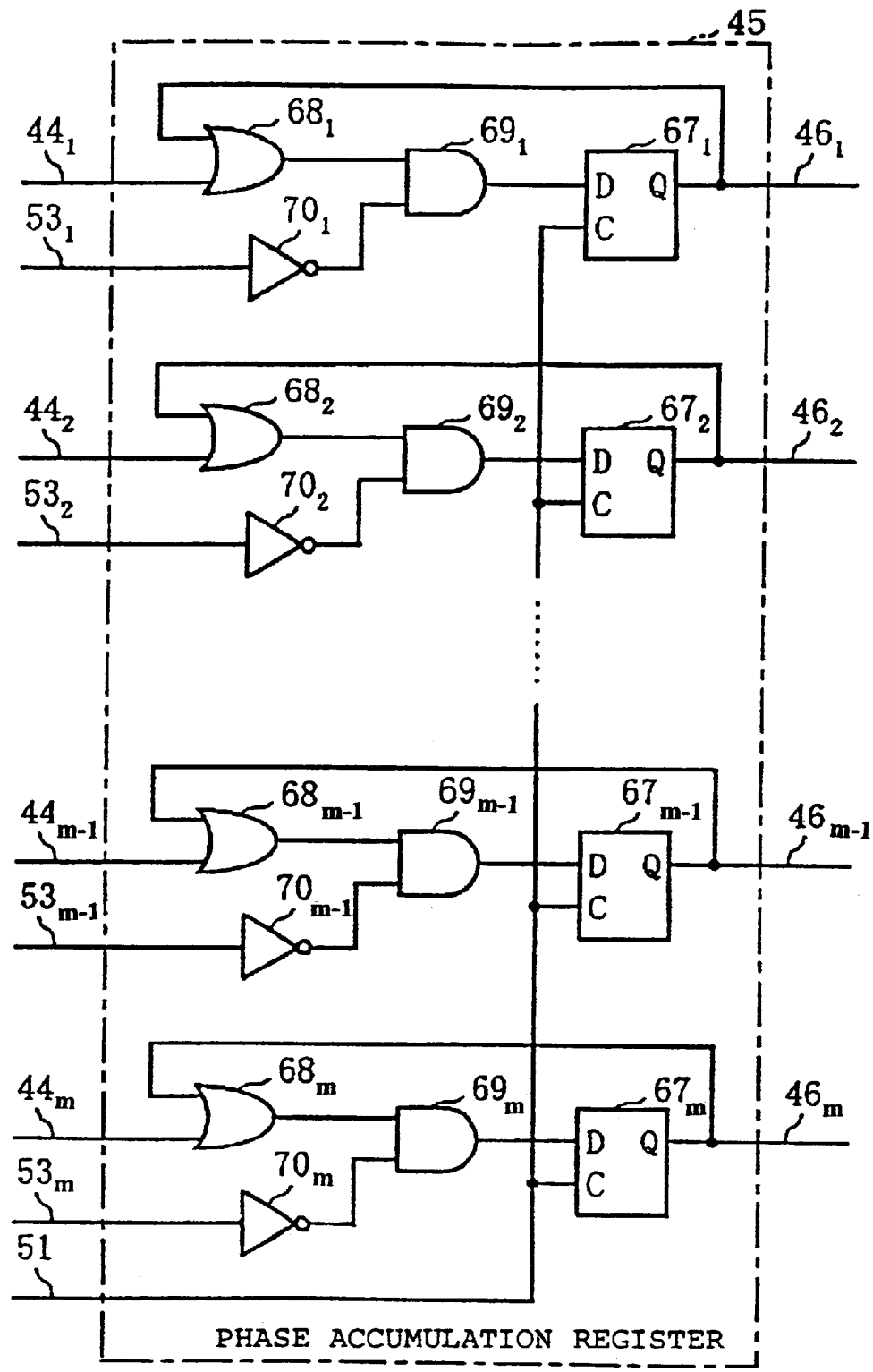
FIG. 6 is a block diagram of a phase accumulation register in the bit synchronization circuit according to the present invention.

FIG. 6 shows in block form the phase accumulation register 45 shown in FIG. 3. Those parts of the phase extraction circuit 34 which are identical to those shown in FIG. 3 are denoted by identical reference numerals, and will not be described in detail below. As shown in FIG. 6, the phase accumulation register 45 has D-FFs $67_1$–$67_m$ having respective C terminals supplied with the both-edge phase signal 51 generated by the edge converter 50. The data edge phase information $44_1$–$44_m$ generated by the data edge detector 43 is supplied to respective input terminals of 2-input, 1-output OR gates $68_1$–$68_m$, whose other input terminals are connected to respective Q terminals of the D-FFs $67_1$–$67_m$. The OR gates $68_1$–$68_m$ have output terminals connected to respective input terminals of 2-input, 1-output AND gates $69_1$–$69_m$ Correction signals 53 generated by the correction circuit 52 are supplied to respective input terminals of INVs $70_1$–$70_m$ which have respective output terminals connected to the other input terminals of the AND gates $69_1$–$69_m$. The AND gates $69_1$–$69_m$ have respective output terminals connected to respective D terminals of the D-FFs $67_1$–$67_m$. The D-FFs $67_1$–$67_m$ have respective Q terminals for outputting the accumulated phase information $46_1$–$46_m$.

When the correction signals are of a logic level "L" indicating that no correction is to be made, the phase accumulation register 45 ORs the data edge phase information $44_1$–$44_m$ and the accumulated phase information $46_1$–$46_m$ for the respective phases, and latches the results with the both-edge phase signal 51. When the correction signals are of a logic level "H" indicating that a correction is to be made, values masked by the AND gates $69_1$–$69_m$ are latched by the D-FFs $67_1$–$67_m$ with the both-edge phase signal 51. Therefore, when no correction is to be made, the accumulated phase information outputted from the D-FFs $67_1$–$67_m$ is fed back and accumulated, and when a correction is to be made, the accumulated phase information that has been accumulated so far is masked to clear the values latched with the both-edge phase signal 51. The accumulated phase information $46_1$–$46_m$ is supplied to the eye center phase calculator 47.

Figure 7:
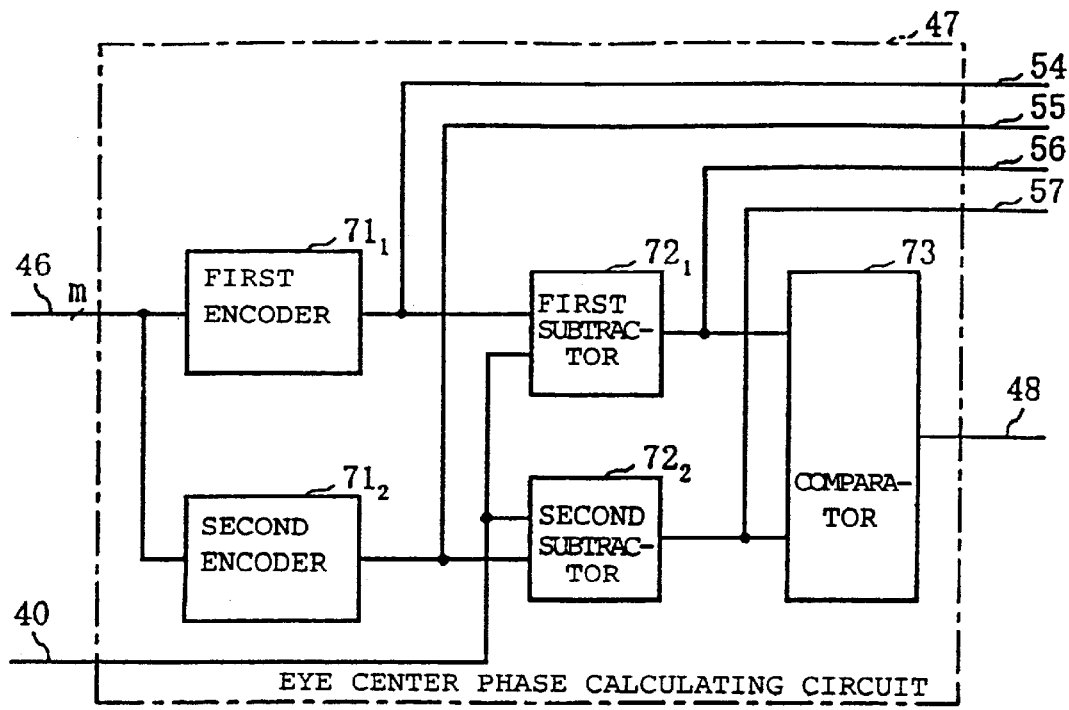
FIG. 7 is a block diagram of an eye center phase calculating circuit in the bit synchronization circuit according to the present invention.

FIG. 7 shows in block form the eye center phase calculator 47 shown in FIG. 3. Those parts of the phase extraction circuit 34 which are identical to those shown in FIG. 3 are denoted by identical reference numerals, and will not be described in detail below. As shown in FIG. 7, the eye center phase calculator 47 has first and second encoders $71_1$, $71_2$ supplied with the accumulated phase information $46_1$–$46_m$ from the phase accumulation register 45. The first encoder $71_1$ encodes the phase of a negative end of the jitter range of the accumulated phase information $46_1$–$46_m$, and outputs negative jitter range information 54 indicative of a negative end of the jitter range due to edge phases detected by the comparison between the both-edge phase signal 51 accumulated by the accumulated phase information $46_1$–$46_m$ and the phases of rising edges of the input data. The second encoder $71_2$ encodes the phase of a positive end of the jitter range of the accumulated phase information $46_1$–$46_m$, and outputs positive jitter range information 55 indicative of a positive end of the jitter amplitude due to edge phases detected by the comparison between the both-edge phase signal 51 accumulated by the accumulated phase information $46_1$–$46_m$ and the phases of falling edges of the input data. The negative jitter range information 54 and the positive jitter range information 55 which are encoded respectively by the first and second encoders $71_1$, $71_2$ are applied to respective input terminals of first and second subtractors $72_1$, $72_2$, whose other input terminals are supplied with the extracted phase value 40 indicative of the presently selected eye center phase.

The first subtractor $72_1$ generates the positive eye opening width information 56 by subtracting the extracted phase value 40 indicative of the eye center phase which is the presently selected clock phase from the negative jitter range information 54. The positive eye opening width information 56 indicates a positive eye opening width from the present eye center phase to the negative end of the jitter range of the eye. The second subtractor $72_2$ generates the negative eye opening width information 57 by subtracting the positive jitter range information 55 from the extracted phase value 40 indicative of the eye center phase which is the presently selected clock phase. The negative eye opening width information 57 indicates a negative eye opening width from the positive end of the jitter range of the eye to the present eye center phase. The positive eye opening width information 56 and the negative eye opening width information 57 are supplied to a comparator 73. The comparator 73 compares the positive eye opening width information 56 and the negative eye opening width information 57 with each other to detect whether the eye center phase which is the presently selected clock phase indicated by the extracted phase value 40 is positive or negative with respect to the eye center phase at the time of comparison. The detected result of the eye center phase is supplied as the eye center phase information 48 from the comparator 73 to the selection phase counter 49.

If the positive eye opening width information 56 is greater than the negative eye opening width information 57, then the eye center phase information 48 represents that the eye center phase which is the presently selected clock phase indicated by the extracted phase value 40 is negative with respect to the eye center phase at the time of comparison, and is outputted as information indicative of the "+" direction for controlling the eye center phase in the positive direction. If the positive eye opening width information 56 is smaller than the negative eye opening width information 57, then the eye center phase information 48 represents that the eye center phase which is the presently selected clock phase indicated by the extracted phase value 40 is positive with respect to the eye center phase at the time of comparison, and is outputted as information indicative of the "−" direction for controlling the eye center phase in the negative direction. If the positive eye opening width information 56 is equal to the negative eye opening width information 57, then the eye center phase information 48 represents that the eye center phase which is the presently selected clock phase indicated by the extracted phase value 40 is the same as the eye center phase at the time of comparison, and is outputted as information indicative of "0" for not controlling the eye center phase.

The eye center phase information 48 generated by the comparator 73 of the eye center phase calculator 47 is supplied to the selection phase counter 49. The negative jitter range information 54, the positive jitter range information 55, the positive eye opening width information 56, and the negative eye opening width information 57 which are generated by the eye center phase calculator 47 are supplied to the correction circuit 52.

The selection phase counter 49 comprises a known up counter and down counter (not shown). The selection phase counter 49 updates the extracted phase value as a counted-up or counted-down value or holds the extracted phase value as it is depending on the eye center phase information 48 supplied thereto. Specifically, if the eye center phase information 48 represents the "+" direction, then the selection phase counter 49 counts up the extracted phase value 40, and generates an extracted phase value indicative of a selected eye center phase which is shifted in phase by "+360/m" corresponding to "+". If the eye center phase information 48 represents the "−" direction, then the selection phase counter 49 counts down the extracted phase value 40, and generates an extracted phase value indicative of a selected eye center phase which is shifted in phase by "−360/m" corresponding to "−". If the eye center phase information 48 represents "0", then the selection phase counter 49 holds the extracted phase value 40 as it is. The generated extracted phase value 40 is supplied to the selector 35 and the eye center phase calculator 47.

Figure 8:
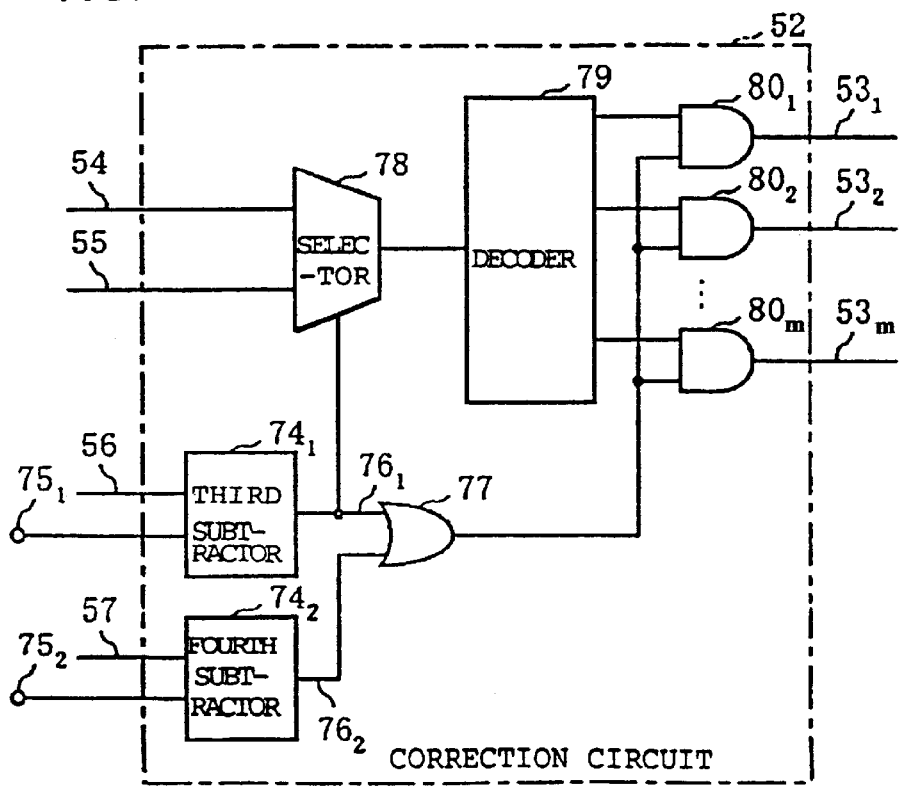
FIG. 8 is a block diagram of a correction circuit in the bit synchronization circuit according to the present invention.

FIG. 8 shows in block form the phase extraction circuit 34 shown in FIG. 3. Those parts of the correction circuit 52 which are identical to those shown in FIG. 3 are denoted by identical reference numerals, and will not be described in detail below. As shown in FIG. 8, the positive eye opening width information 56 and the negative eye opening width information 57 which are generated by the eye center phase calculator 47 are supplied to respective input terminals of third and fourth subtractors $74_1$, $74_2$ of the correction circuit 52. The correction circuit 52 has an eye insurance positive opening width setting terminal $75_1$ and an eye insurance negative opening width setting terminal $75_2$. The eye insurance positive opening width setting terminal $75_1$, which is supplied with a predetermined positive opening width setting value, is connected to the other input terminal of the third subtractor $74_1$. The eye insurance negative opening width setting terminal $75_2$, which is supplied with a predetermined negative opening width setting value, is connected to the other input terminal of the fourth subtractor $74_2$. The third subtractor $74_1$ subtracts the positive eye opening width information 56 from the predetermined positive opening width setting value, and outputs a first detected signal $76_1$ having a logic level "H" when the positive eye opening width information 56 is equal to or smaller than the positive opening width setting value. The fourth subtractor $74_2$ subtracts the negative eye opening width information 57 from the predetermined negative opening width setting value, and outputs a second detected signal $76_2$ having a logic level "H" when the negative eye opening width information 57 is equal to or smaller than the negative opening width setting value. The first and second detected signals $76_1$, $76_2$ are applied to respective input terminals of a 2-input, 1-output OR gate 77.

The negative jitter range information 54 and the positive jitter range information 55 which are generated by the eye center phase calculator 47 are supplied to respective input terminals of a 2-input, 1-output selector 78. The selector 78 alternatively selects one of positive and negative both-edge phases of jitter to be corrected which are indicated respectively by the negative jitter range information 54 and the positive jitter range information 55, depending on one of the first and second detected signals $76_1$, $76_2$. Specifically, if the positive eye opening width information 56 is equal to or smaller than the positive opening width setting value as determined by the first detected signal $76_1$, then the selector 78 selects the positive jitter range information 55. If the negative eye opening width information 57 is equal to or smaller than the negative opening width setting value as determined by the second detected signal $76_2$, then the selector 78 selects the negative jitter range information 54. In the selector 78 shown in FIG. 8, the first detected signal $76_1$ is used as a preferential control signal for the selector 78, which selects the positive jitter range information 55 if the positive eye opening width information 56 is equal to or smaller than the positive opening width setting value. Otherwise, the selector 78 selects the negative jitter range information 54. The jitter range information selected by the selector 78 is supplied to a decoder 79.

The decoder 79 converts the jitter range information selected by the selector 78 into an m-bit decoded correction signal. The jitter range information indicates a positive or negative end of the jitter range among the divided m phase regions. Therefore, the decoded correction signal produced by the decoder 79 is of a "H" level only for a bit corresponding to the positive or negative end of the jitter range, among the m-bits. The m-bit data of the decoded correction signal thus generated are applied to respective input terminals of 2-input, 1-output AND gates $80_1$–$80_m$. The other input terminals of the AND gates $80_1$–$80_m$ are connected in common to the output terminal of the OR gate 77. The AND gates $80_1$–$80_m$ have respective output terminals which output m-bit correction signals $53_1$–$53_m$. Since the OR gate 77 outputs a logic level "L" when both the first and second detected signals $76_1$, $76_2$ are of a logic level "L", the OR gate 77 can mask the decoded correction signal outputted from the decoder 79.

As described above, the correction circuit 52 clears the positive or negative end of the jitter range to increase the eye opening width when the eye opening width is reduced due to the jitter distribution of the input data, if the eye opening width based on the presently selected extracted phase is smaller than a predetermined value, according to the negative jitter range information 54, the positive jitter range information 55, the positive eye opening width information 56, and the negative eye opening width information 57 which are generated by the eye center phase calculator 47 based on the accumulated phase information. Specifically, if the positive eye opening width is reduced, the negative jitter range is corrected to increase the eye opening width, and if the negative eye opening width is reduced, the positive jitter range is corrected to increase the eye opening width. In this manner, the correction circuit 52 generates the correction signals $53_1$–$53_m$. These correction signals $53_1$–$53_m$ are supplied to the phase accumulation register 45 to clear a corresponding bit of the accumulated phase information in the divided m phase regions. In this fashion, an undetermined phase value at the time the power supply is turned on is cleared, and even when the phase varies due to wanderings of the input data, a sufficient adjustment margin is maintained in a manner to follow such phase variations.

Figure 9:
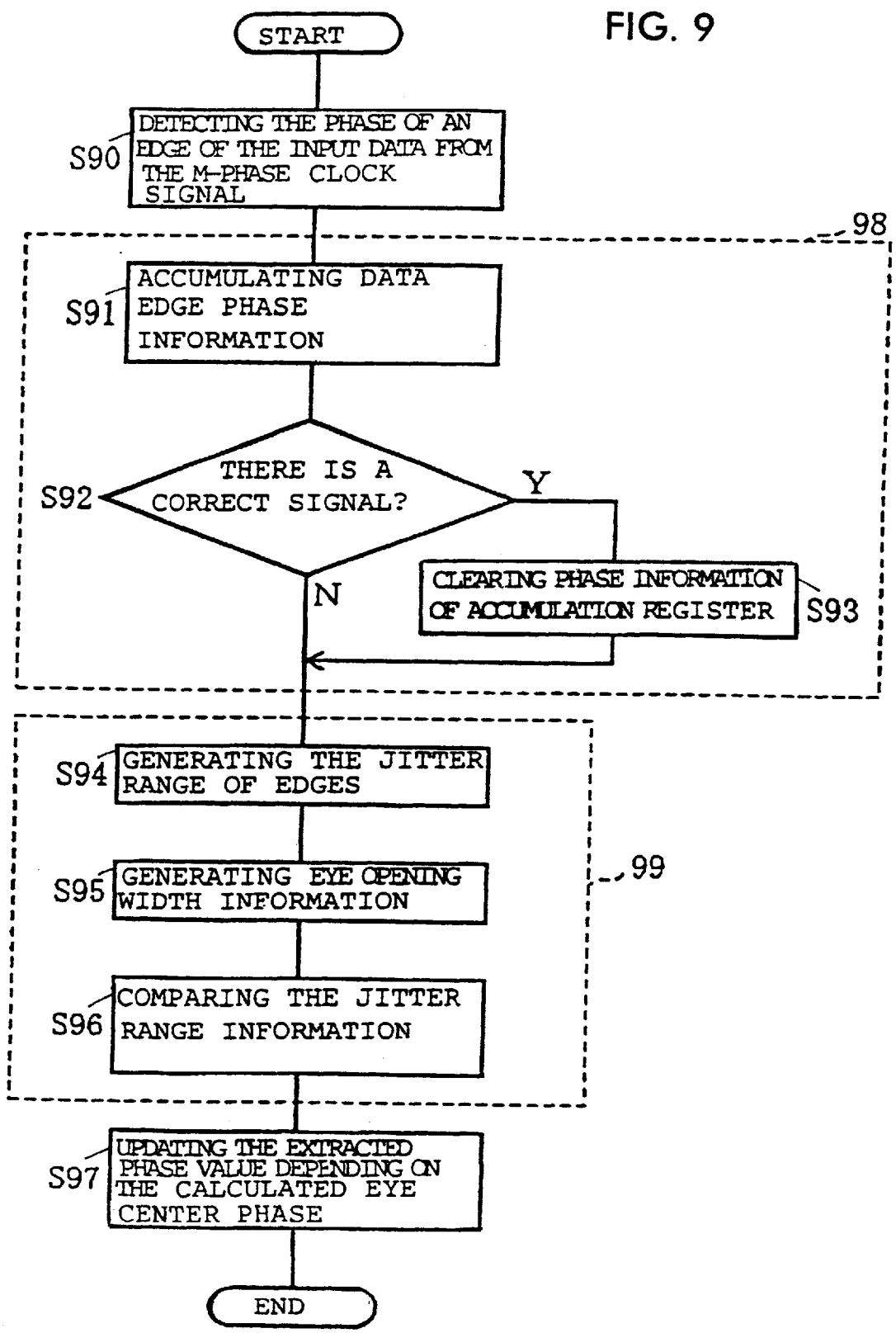
FIG. 9 is a flowchart showing an operation algorithm of the bit synchronization circuit according to the present invention.

The bit synchronization circuit thus constructed operates according to the following algorithm:

FIG. 9 schematically shows an operation algorithm of the bit synchronization circuit according to the present invention shown in FIGS. 2 through 8. M-phase clock signals 39 out of phase with each other by 360/m are generated from the reference clock supplied from the clock input terminal 31. A both-edge phase signal 51 is generated which represents the phases of both rising and falling edges of the input data 37 supplied from the data input terminal 30 with only the rising edge. Then, the phase of an edge of the input data 37 is detected from the m-phase clock signals $39_1$–$39_m$ and the both-edge phase signal 51, and data edge phase information 44 is generated (step S90). From the data edge phase information 44, data edge phase information from the past to the present is accumulated in each of the m phase regions divided from one period of the input data 37 (step S91). At this time, if the correction signals $53_1$–$53_m$ corresponding to the m phase regions are inputted (step S92: Y), the phase information to be accumulated is cleared (step S93). If the correction signals are not inputted (step S92: N) or after registers corresponding to the inputted correction signals are cleared (step S93), the negative jitter range information 54 and the positive jitter range information 55 which are indicative of the phase regions of negative and positive ends of the jitter range of edges are generated from the accumulated phase information 46 (step S94). Then, the positive eye opening width information 56 and the negative eye opening width information 57 which are indicative of positive and negative eye opening widths at the present are generated from the extracted phase value 40 representing the presently selected eye center phase and the negative jitter range information 54 and the positive jitter range information 55 (step S95). The negative jitter range information 54 and the positive jitter range information 55 are compared (step S96) to generate the eye center phase information 48 which is indicative of whether the eye center phase is positive or negative with respect to the extracted phase value 40. Based on the eye center phase information 48, the extracted phase value is updated depending on the calculated eye center phase (step S97), after which the algorithm is ended. Step S90 is carried out by the data edge detector 43. The processing 98 of steps 91–93 is carried out by the phase accumulation register 45. The processing 99 of steps S94–S95 is carried out by the eye center phase calculator 47. Step S97 is carried out by the selection phase counter 49.

Figure 10:
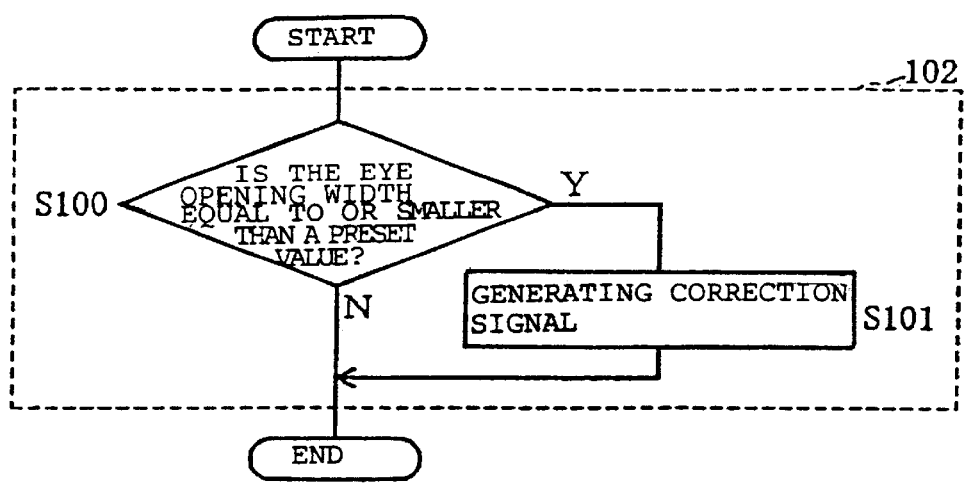
FIG. 10 is a flowchart showing a process of generating a correction signal with the phase extraction circuit.

FIG. 10 schematically shows an algorithm for generating a correction signal of the bit synchronization circuit. If the eye opening width based on the presently selected extracted value is equal to or smaller than a predetermined value (step S100: Y) according to the negative jitter range information 54, the positive jitter range information 55, the positive eye opening width information 56, and the negative eye opening width information 57 which are generated in steps S94, S95 shown in FIG. 9, when the eye opening width is reduced due to the jitter distribution of the input data, a correction signal is generated for clearing an opposite edge of the reduced eye opening width to increase the eye opening width (step S101). After the correction signal is generated (step S101), or if the eye opening width based on the presently selected extracted value is neither equal to nor smaller than the predetermined value (step S100: N), the algorithm is ended. The processing 102 of steps S100, S101 is carried out by the correction circuit 52.

Specific operation of the bit synchronization circuit will be described below with reference to timing charts.

Figure 11:
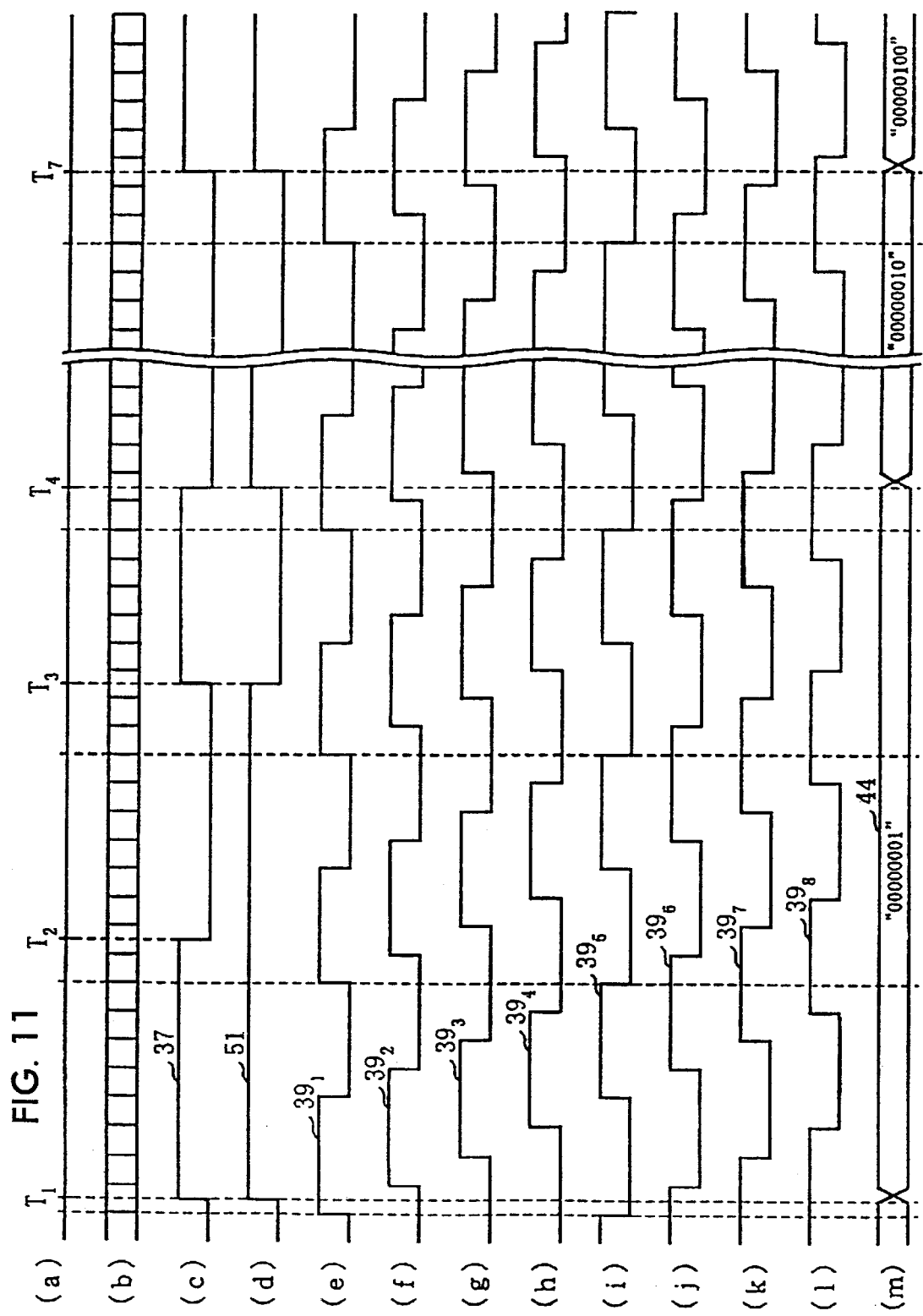
FIG. 11 is a timing chart illustrative of a first mode of operation of the bit synchronization circuit according to the present invention.

FIG. 11 is a timing chart illustrative of a first mode of operation of the bit synchronization circuit according to the present invention. From the reference clock 38 supplied from the clock input terminal 31, the m-phase clock generator 33 generates 8-phase clock signals $39_1$–$39_8$. The input data 37 supplied from the data input terminal 30 has edges at times T1, T2, T3, T4, T5, T6, T7 (T1<T2<...<T6<T7). FIG. 11 shows at (a) times for identifying phase regions on the timing chart. FIG. 11 shows at (b) m phase regions divided from one given period. One given period is divided into eight phase regions, with a phase region number "1" at the time T1, a phase region number "2" at the time T2, ..., and a phase region number "8" at the time T8. FIG. 11 shows at (c) a time sequence of the input data 37. FIG. 11 shows at (d) a time sequence of the both-edge phase signal 51. FIG. 11 shows at (e)–(l) time sequences of the 8-phase clock signals $39_1$–$39_8$. FIG. 11 shows at (m) a time sequence of the data edge phase information 44, including data edge phase information $44_8$, $44_7$, ..., $44_1$ successively from a high-order bit.

From the input data 37 which varies from the logic level "H" to the logic level "L" at the time T1 and thereafter varies at the times T2, T3, T4, T7 (the times T5, T6 not shown) as shown in FIG. 11 at (c), the edge converter 50 generates the both-edge phase signal 51 having rising edges at the rising-edge phase times T1, T7 and the falling-edge phase time T4 as shown in FIG. 11 at (d). Based on the reference clock 38, the m-phase clock generator 33 generates the 8-phase clock signals $39_1$–$39_8$ which have the same frequency as the data rate of the input date 37 and are out of phase with each other by 360/8, as shown in FIG. 11 at (e)–(l). The data edge detector 43 detects phases where the logic levels between adjacent two phases at a rising edge of the both-edge phase signal 51 are "10" from the phase relationship between the both-edge phase signal 51 and the 8-phase clock signals $39_1$–$39_8$, and output the detected phases as data edge phase information $44_1$–$44_m$. At the time T1, since the clock signals $39_1$, $39_2$ have the logic relationship of "10" at a rising edge of the both-edge phase signal 51, the data edge phase information 44 where only the data edge phase information $44_1$ is of the logic level "H" is "00000001" as shown in FIG. 11 at (m). Similarly, at the time T4, since the clock signals $39_2$, $39_3$ have the logic relationship of "10" at a rising edge of the both-edge phase signal 51, the data edge phase information 44 where only the data edge phase information $44_2$ is of the logic level "H" is "00000010". At the time T7, the data edge phase information 44 where only the data edge phase information $44_3$ is of the logic level "H" is "00000100".

Figure 12:
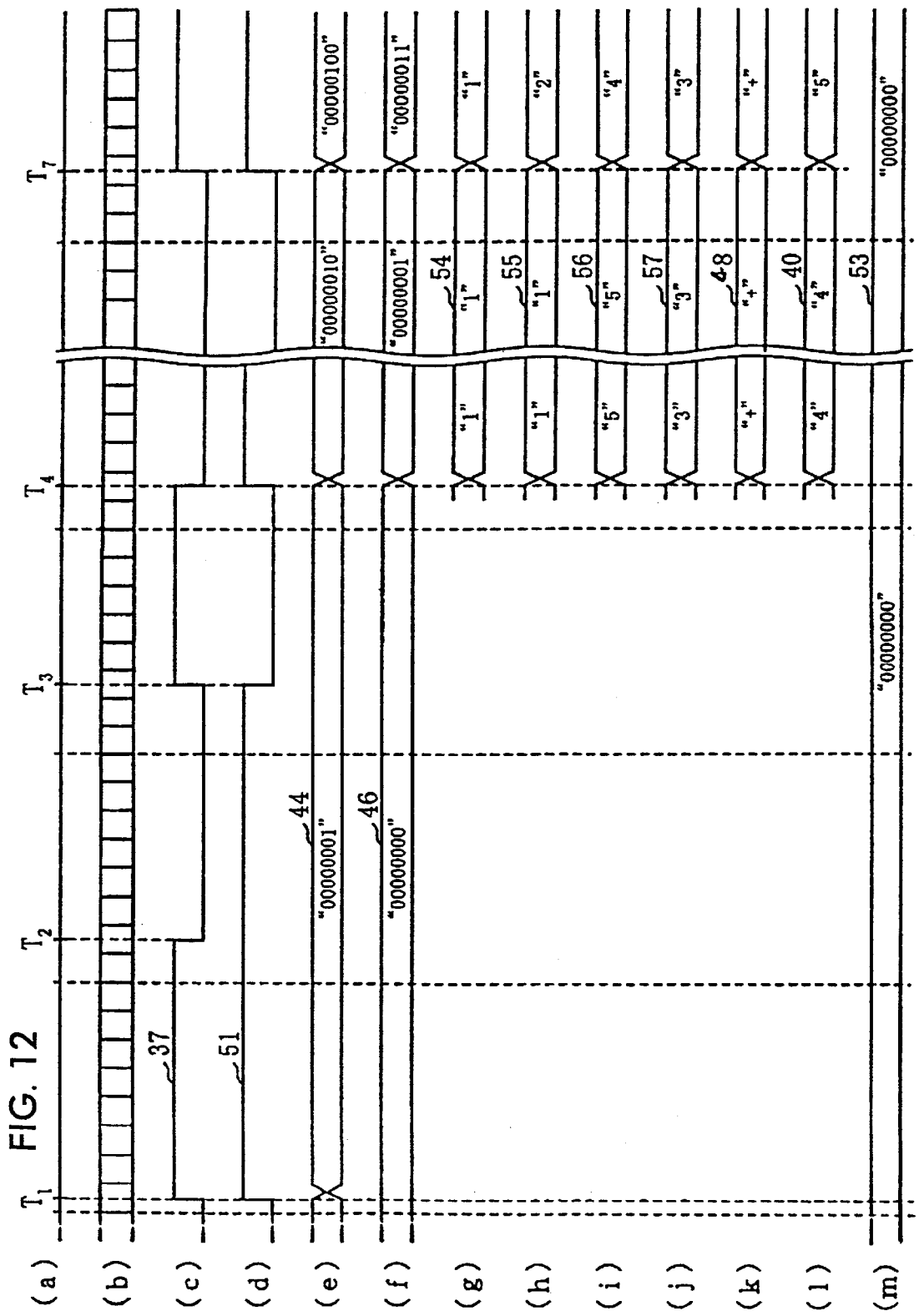
FIG. 12 is a timing chart illustrative of other signals at the same timing as the first mode of operation of the bit synchronization circuit according to the present invention.

FIG. 12 is a timing chart illustrative of other signals at the same timing as the first mode of operation of the bit synchronization circuit according to the present invention.

FIG. 12 shows at (a)–(d) time sequences which are the same as those shown at (a)–(d) in FIG. 11. FIG. 12 shows at (e) a time sequence which is the same as that shown at (m) in FIG. 11. FIG. 12 shows at (f) a time sequence of the accumulated phase information 46. FIG. 12 shows at (g) a time sequence of the negative jitter range information 54. FIG. 12 shows at (h) a time sequence of the positive jitter range information 55. FIG. 12 shows at (i) a time sequence of the positive eye opening width information 56. FIG. 12 shows at (j) a time sequence of the negative eye opening width information 57. FIG. 12 shows at (k) a time sequence of the eye center phase information 48. FIG. 12 shows at (l) a time sequence of the extracted phase value 40. FIG. 12 shows at (m) a time sequence of the correction signal 53.

As shown in FIG. 12 at (f), the accumulated phase information 46 accumulated by the phase accumulation register 45 is "00000000" until the time T4, and the correction signal 52 is also "00000000". At the time T4, since the phase accumulation register 45 latches the data edge phase information 44 "00000001" at a rising edge of the both-edge phase signal 51, the accumulated phase information 46 "00000000" is held. At the time T7, similarly, since the phase accumulation register 45 latches data produced by ORing the data edge phase information 44 "00000010" and the accumulated phase information "00000001" accumulated so far, the accumulated phase information 46 "00000011" is held.

The jitter range or the eye opening will be described below for the purpose of describing various signals generated by the eye center phase calculator 47.

Figure 13:
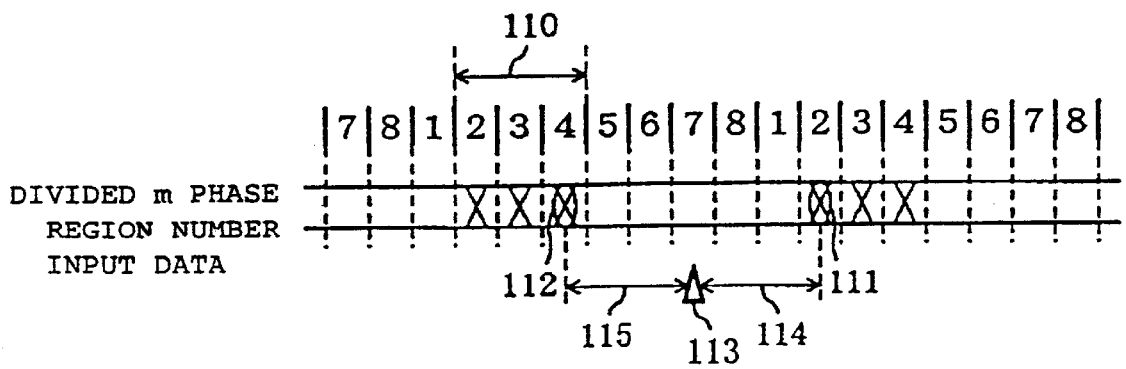
FIG. 13 is a diagram showing the relationship between various signals generated by the eye center phase calculating circuit.

FIG. 13 shows the relationship between various signals generated by the eye center phase calculating circuit 47. Specifically, FIG. 13 shows the relationship between the various signals when the accumulated phase information 46 is "00001110", i.e., indicates that phase detection is performed accumulatively at the divided m phase region numbers "2"–"4". A jitter amplitude 110 is "3". Negative jitter range information 111 represents a phase region corresponding to the divided m phase region number "2", and positive jitter range information 112 represents a phase region corresponding to the divided m phase region number "4". If it is assumed that an extracted phase value 113 is in a phase region represented by the divided m phase region number "7", then positive jitter range information 114 is "3" indicating the width between the negative end 111 of the jitter range information and the extracted phase value 113, and negative jitter range information 115 is "3" indicating the width between the extracted phase value 113 and the positive end 112 of the jitter range information.

Referring back to FIG. 12, at the time T4, since the accumulated phase information 46 is "00000001", the jitter amplitude is "1", and the negative jitter range information 54 shown in FIG. 12 at (g) is "1" representing a divided phase region number. Similarly, the positive jitter range information 55 shown in FIG. 12 at (h) is "1" representing a divided phase region number. At the time T7, since the accumulated phase information 46 is "00000011", the jitter amplitude is "2", and the negative jitter range information 54 is "1" representing the divided phase region number "1", and the positive jitter range information 55 is "2" representing the divided phase region number "2".

If the extracted phase value 40 is "4" as shown in FIG. 12 at (l), then at the time T4, the positive eye opening width information 56 is "5" produced by subtracting the extracted phase value 40 from the negative jitter range information 54, and the negative eye opening width information 57 is "3" produced by subtracting the positive jitter range information 55 from the extracted phase value 40. The comparator in the eye center phase calculator 47 compares the positive eye opening width information 56 and the negative eye opening width information 57 with each other. Since the positive eye opening width information 56 is greater than the negative eye opening width information 57, it is determined that the eye center phase is positive with respect to "4" indicated by the extracted phase value 40. The eye center phase information 48 is outputted as information indicative of the phase control in the "+" direction. The extracted phase value 40 is counted up to "5" in synchronism with a next rising edge of the both-edge phase signal 51.

It is assumed that "2" is supplied as the predetermined positive opening width setting value and the predetermined negative opening width setting value from the eye insurance positive opening width setting terminal $75_1$, and the eye insurance negative opening width setting terminal $75_2$. Since the positive eye opening width information 56 and the negative eye opening width information 57 are greater than the predetermined positive opening width setting value and the predetermined negative opening width setting value, respectively, all the correction signals $53_1$–$53_m$ are of the logic level "L".

At the time T7, the positive eye opening width information 56 is "4" produced by subtracting the extracted phase value 40 from the negative jitter range information 54, and the negative eye opening width information 57 is "3" produced by subtracting the positive jitter range information 55 from the extracted phase value 40. The comparator in the eye center phase calculator 47 compares the positive eye opening width information 56 and the negative eye opening width information 57 with each other. Since the positive eye opening width information 56 is greater than the negative eye opening width information 57, it is determined that the eye center phase is positive with respect to "5" indicated by the extracted phase value 40. The eye center phase information 48 is outputted as information indicative of the phase control in the "+" direction. Since the positive eye opening width information 56 and the negative eye opening width information 57 are greater than the predetermined positive opening width setting value and the predetermined negative opening width setting value, respectively, all the correction signals $53_1$–$53_m$ are of the logic level "L".

Figure 14:
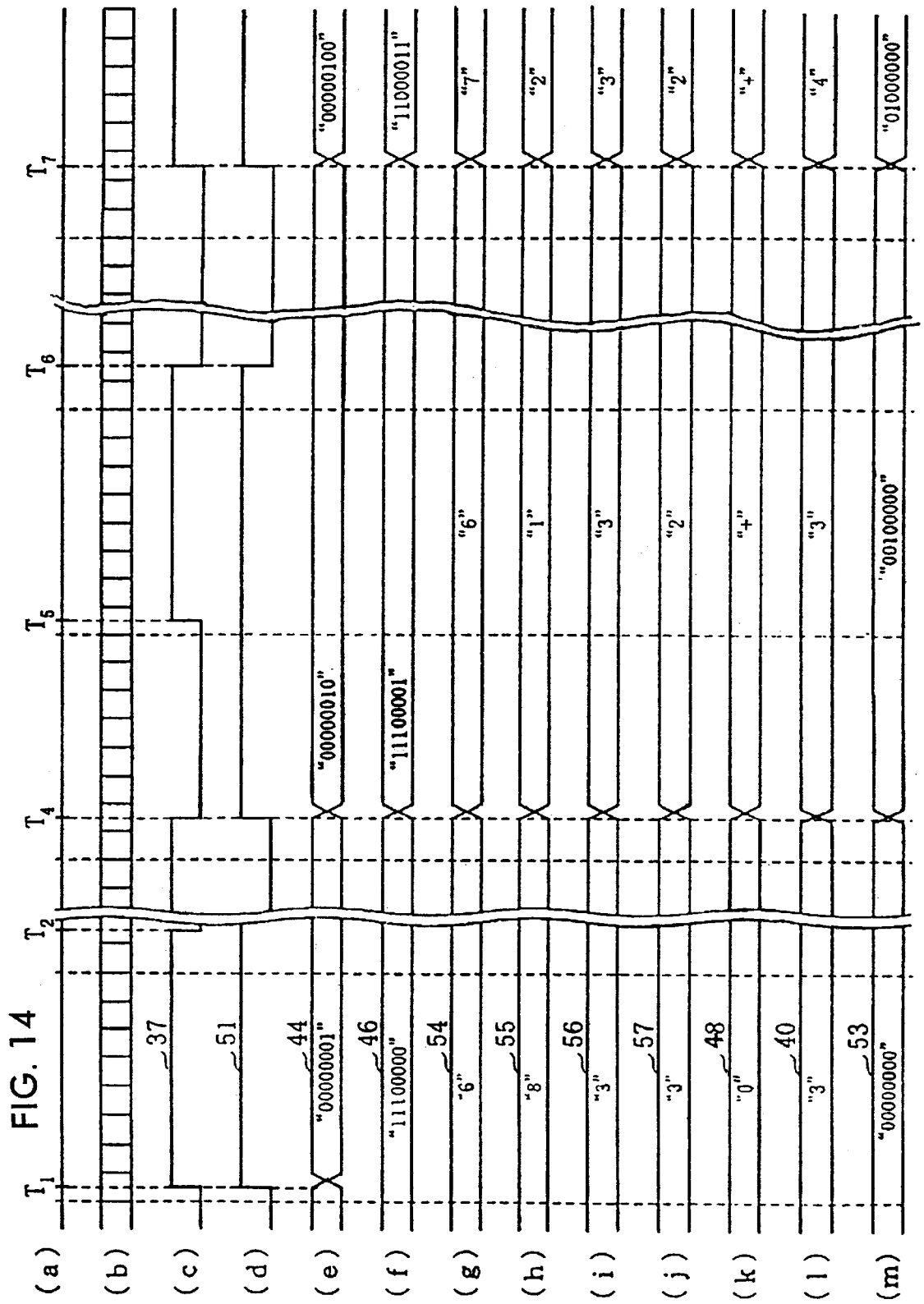
FIG. 14 is a timing chart illustrative of a second mode of operation of the bit synchronization circuit according to the present invention.

FIG. 14 is a timing chart illustrative of a second mode of operation of the bit synchronization circuit according to the present invention. From the reference clock 38 supplied from the clock input terminal 31, the m-phase clock generator 33 generates 8-phase clock signals $39_1$–$39_8$. The input data 37 supplied from the data input terminal 30 has a jitter amplitude corresponding to three of the divided m phase regions, and has edges at times T1, T2, T3, T4, T5, T6, T7 (the time T3 not shown, T1<T2<. . . <T6<T7). FIG. 14 shows at (a) times for identifying phase regions on the timing chart. FIG. 14 shows at (b) m phase regions divided from one given period. One given period is divided into eight phase regions, with a phase region number "1" at the time T1, a phase region number "2" at the time T2, . . . , and a phase region number "8" at the time T8. FIG. 14 shows at (c) a time sequence of the input data 37. FIG. 14 shows at (d) a time sequence of the both-edge phase signal 51. FIG. 14 shows at (e) a time sequence of the data edge phase information 44. FIG. 14 shows at (f) a time sequence the accumulated phase information 46. FIG. 14 shows at (g) a time sequence of the negative jitter range information 54. FIG. 14 shows at (h) a time sequence of the positive jitter range information 55. FIG. 14 shows at (i) a time sequence of the positive eye opening width information 56. FIG. 14 shows at (j) a time sequence of the negative eye opening width information 57. FIG. 14 shows at (k) a time sequence of the eye center phase information 48. FIG. 14 shows at (l) a time sequence of the extracted phase value 40. FIG. 14 shows at (m) a time sequence of the correction signal 53.

The time sequences shown in FIG. 14 at (a)–(e) are the same as those of the first mode of operation shown in FIGS. 11 and 12, and will not be described below. It is assumed that the accumulated phase information 46 shown in FIG. 14 at (f) represents "11100000" corresponding to divided m phase region numbers "6"–"8" up to the time T4. Similarly, it is assumed that the extracted phase value 40 is set to "3" up to the time T4. Therefore, up to the time T4, the negative jitter range information 54 produced by decoding the negative end of the jitter range of the accumulated phase information 46 represents the divided m phase region number "6", and the positive jitter range information 55 produced by decoding the positive end of the jitter range of the accumulated phase information 46 represents the divided m phase region number "8". At the time T4, the accumulated phase information 46 represents "11100001" accumulating detected phase information corresponding to the divided m phase region number "1" in synchronism with a rising edge of the both-edge phase signal 51.

At the time T4, since the accumulated phase information 46 represents "11100001", the negative jitter range information 54 produced by decoding the negative end of the jitter range represents the divided m phase region number "6", and the positive jitter range information 55 produced by decoding the positive end of the jitter range represents the divided m phase region number "1".

Up to the time T4, because the extracted phase value is "3", the positive eye opening width information 56 produced by subtracting the present extracted phase value 40 from the negative jitter range information 54 represents "3", and the negative eye opening width information 57 produced by subtracting the positive jitter range information 55 from the present extracted phase value 40 represents "3". Therefore, the eye center phase information 48 represents "0", and since the extracted phase value is not updated by the selection phase counter 49, the extracted phase value 40 remains to be "3" subsequent to the time T1. Inasmuch as the positive eye opening width information 56 and the negative eye opening width information 57 are greater than the predetermined positive opening width setting value and the predetermined negative opening width setting value, respectively, all the correction signals 53 are of the logic level "L".

At the time T4, since the extracted phase value 40 is "3", the negative jitter range information 54 represents "6", and the positive jitter range information 55 represents "1", and hence the positive eye opening width information 56 represents "3" and the negative eye opening width information 57 represents "2". Therefore, the eye center phase information represents "+", so that the selective phase counter 49 counts up the extracted phase value and updates it into "4" at a next rising edge of the both-edge phase signal 51. After the time T4, because the negative eye opening width information 57 is equal to or smaller than the predetermined negative opening width setting value, the correction signal 53 for clearing the divided m phase region number "6" represented by the negative jitter range information 54 is outputted as "00100000". Consequently, at the time T7 synchronous with a next rising edge of the both-edge phase signal 51, the phase accumulation register corresponding to the divided m phase region number "6" of the accumulated phase information 46 is cleared, and the accumulated phase information 46 represents "11000011".

At the time T7, therefore, from the accumulated phase information 46 which represents "11000011", the negative jitter range information 54 produced by decoding the negative end of the jitter range represents the divided m phase region number "7", and the positive jitter range information 55 produced by decoding the positive end of the jitter range represents the divided m phase region number "2". At the time T7, since the extracted phase value 40 is updated into "4", the positive eye opening width information 56 produced by subtracting the present extracted phase value 40 from the negative jitter range information 54 represents "3", and the negative eye opening width information 57 produced by subtracting the positive jitter range information 55 from the present extracted phase value 40 represents "2". Therefore, the eye center phase information 48 represents "+", and the selective phase counter 49 updates the extracted phase value. The extracted phase value 40 represents "5" at a next rising edge of the both-edge phase signal 51 (at the time t10, not shown).

At the time T7, since the negative eye opening width information 57 is equal to or smaller than the predetermined negative opening width setting value "2", the correction signal 53 for clearing the divided m phase region number "7" represented by the negative jitter range information 54 is outputted as "01000000". Consequently, at a next rising edge of the both-edge phase signal 51, the phase accumulation register corresponding to the divided m phase region number "7" of the accumulated phase information 46 is cleared.

As described above, in the bit synchronization circuit according to the present invention, the edge converter 50 generates the both-edge phase signal 51 which represents rising and falling edges of the input data 37 with only the phase of a rising edge, for example, and the data edge detector 43 compares the phase of the both-edge phase signal 51 and the phases of m-phase clock signals produced by dividing the reference clock 38 by m. The data edge phase information 44 representing the compared result is accumulated in each phase by the phase accumulation register 45, and the jitter distribution of the input data 37 is stored as accumulated phase information 46. Based on the accumulated phase information 46, the eye center phase calculator 47 decodes negative and positive ends of the jitter range respectively as negative jitter range information 54 and positive jitter range information 55, and calculates a phase control direction in relation to the extracted phase value 40 which represents the presently selected clock phase. The positional relationship between the present eye opening width and the extracted phase value 40 is extracted from the negative jitter range information 54, the positive jitter range information 55, and the extracted phase value 40, and accumulated phase information opposite to an opening width smaller than a predetermined opening width is cleared to increase the eye opening width for thereby extracting a timing adjustment clock capable of following wanderings of the input data. Since the phase accumulation register accumulates the phases of edges of the input data from the past to the present as a jitter distribution, the central phase of the eye opening can be extracted irrespective of the jitter distribution, and a uniform timing adjustment margin can be maintained. Both rising and falling edges of the input data are converted into one of those edges for the data edge detector to detect edges with the phases of both rising and falling edges. Thus, even if the phases of rising and falling edges suffer variations, phases can be extracted taking into account the phase information of both rising and falling edges. It is therefore possible to extract an optimum timing adjustment clock even when the duty ratio of the input data is degraded.

While a preferred embodiment of the present invention has been described using specific terms, such description is for illustrative purposes only, and it is to be understood that changes and variations may be made without departing from the spirit or scope of the following claims.

What is claimed is:

1. A bit synchronization circuit comprising:

clock generating means for generating a plurality of clocks having respective different phases from a reference clock;

clock selecting means for alternatively selecting one of said plurality of clocks based on an extracted phase value indicative of either one of said phases;

latch means for latching input data with the clock selected by said clock selecting means;

edge detecting means for detecting an edge of said input data;

storage means for storing accumulated edges detected by said edge detecting means as phase information;

jitter range detecting means for detecting positive and negative ends of a jitter range from the phase information accumulatively stored by said storage means;

center phase calculating means for calculating a central phase of an eye pattern from the positive and negative ends of the jitter range which have been detected by said jitter range detecting means; and extracted phase value updating means for updating said extracted phase value depending on a result of comparison of the central phase of the eye pattern calculated by said center phase calculating means and said extracted phase value at the, time the central phase of the eye pattern is calculated.

2. A bit synchronization circuit comprising:

clock generating means for generating a plurality of clocks having respective different phases from a reference clock;

clock selecting means for alternatively selecting one of said plurality of clocks based on an extracted phase value indicative of either one of said phases;

latch means for latching input data with the clock selected by said clock selecting means;

edge detecting means for detecting an edge of said input data;

storage means for storing accumulated edges detected by said edge detecting means as phase information;

jitter range detecting means for detecting positive and negative ends of a jitter range from the phase information accumulatively stored by said storage means;

first calculating means for calculating a first width between the positive end detected by said jitter range detecting means and said extracted phase value;

second calculating means for calculating a second width between the negative end detected by said jitter range detecting means and said extracted phase value; and extracted phase value updating means for updating said extracted phase value depending on a result of comparison of said first and second widths calculated respectively by said first and second calculating means.

3. A bit synchronization circuit according to claim 2, further comprising:

first comparing means for comparing the first width calculated by said first calculating means with a predetermined first setting value;

second comparing means for comparing the second width calculated by said second calculating means with a predetermined second setting value; and correction signal generating means for generating a correction signal for clearing the negative end of said jitter range if said first width is smaller than said predetermined first setting value and clearing the positive end of said jitter range if said second width is smaller than said predetermined second setting value;

said storage means comprising means for clearing an edge of the phase information corresponding to the correction signal generated by said correction signal generating means.

4. A bit synchronization circuit according to claim 1, further comprising:

edge converting means for generating a both-edge phase signal which represents rising and falling edges of said input data as converted into either one of the rising and falling edges;

the arrangement being such that said edge detecting means, said storage means, and said extracted phase value updating means are synchronized with the both-edge phase signal generated by said edge converting means.

5. A bit synchronization circuit according to claim 2, further comprising:

edge converting means for generating a both-edge phase signal which represents rising and falling edges of said input data as converted into either one of the rising and falling edges;

the arrangement being such that said edge detecting means, said storage means, and said extracted phase value updating means are synchronized with the both-edge phase signal generated by said edge converting means.

6. A bit synchronization circuit according to claim 3, further comprising:

edge converting means for generating a both-edge phase signal which represents rising and falling edges of said input data as converted into either one of the rising and falling edges;

the arrangement being such that said edge detecting means, said storage means, and said extracted phase value updating means are synchronized with the both-edge phase signal generated by said edge converting means.

7. A bit synchronization circuit according to claim 4, wherein said edge detecting means comprises means for detecting an edge of said input data when each of the phases is of a logic level "H" and an adjacent phase is of a logic level "L" in synchronism with said both-edge phase signal.

8. A bit synchronization circuit according to claim 1, wherein said phases are identifiable by predetermined phase region numbers divided in a predetermined period.

9. A bit synchronization circuit according to claim 2, wherein said phases are identifiable by predetermined phase region numbers divided in a predetermined period.

10. A bit synchronization circuit according to claim 3, wherein said phases are identifiable by predetermined phase region numbers divided in a predetermined period.

11. A bit synchronization circuit according to claim 4, wherein said phases are identifiable by predetermined phase region numbers divided in a predetermined period.

12. A bit synchronization circuit according to claim 5, wherein said phases are identifiable by predetermined phase region numbers divided in a predetermined period.

13. A bit synchronization circuit according to claim 6, wherein said phases are identifiable by predetermined phase region numbers divided in a predetermined period.

14. A bit synchronization circuit according to claim 7, wherein said phases are identifiable by predetermined phase region numbers divided in a predetermined period.

15. A bit synchronization circuit according to claim 8, wherein said extracted phase value updating means comprises:

center phase information generating means for generating center phase information indicative of phase control in a negative direction if said first width is greater than said second width and indicative of phase control in a negative direction if said first width is smaller than said second width; and extracted phase value counting means for counting down said extracted phase value if the center phase information generated by said center phase information generating means is indicative of phase control in the negative direction, and counting up said extracted phase value if the center phase information generated by said center phase information generating means is indicative of phase control in the positive direction.

16. A bit synchronization circuit according to claim 9, wherein said extracted phase value updating means comprises:

center phase information generating means for generating center phase information indicative of phase control in a negative direction if said first width is greater than said second width and indicative of phase control in a negative direction if said first width is smaller than said second width; and extracted phase value counting means for counting down said extracted phase value if the center phase information generated by said center phase information generating means is indicative of phase control in the negative direction, and counting up said extracted phase value if the center phase information generated by said center phase information generating means is indicative of phase control in the positive direction.

17. A bit synchronization circuit according to claim 10, wherein said extracted phase value updating means comprises:

center phase information generating means for generating center phase information indicative of phase control in a negative direction if said first width is greater than said second width and indicative of phase control in a negative direction if said first width is smaller than said second width; and extracted phase value counting means for counting down said extracted phase value if the center phase information generated by said center phase information generating means is indicative of phase control in the negative direction, and counting up said extracted phase value if the center phase information generated by said center phase information generating means is indicative of phase control in the positive direction.

18. A bit synchronization circuit according to claim 11, wherein said extracted phase value updating means comprises:

center phase information generating means for generating center phase information indicative of phase control in a negative direction if said first width is greater than said second width and indicative of phase control in a negative direction if said first width is smaller than said second width; and extracted phase value counting means for counting down said extracted phase value if the center phase information generated by said center phase information generating means is indicative of phase control in the negative direction, and counting up said extracted phase value if the center phase information generated by said center phase information generating means is indicative of phase control in the positive direction.

19. A bit synchronization circuit according to claim 12, wherein said extracted phase value updating means comprises:

center phase information generating means for generating center phase information indicative of phase control in a negative direction if said first width is greater than said second width and indicative of phase control in a negative direction if said first width is smaller than said second width; and extracted phase value counting means for counting down said extracted phase value if the center phase information generated by said center phase information generating means is indicative of phase control in the negative direction, and counting up said extracted phase value if the center phase information generated by said center phase information generating means is indicative of phase control in the positive direction.

20. A bit synchronization circuit according to claim 13, wherein said extracted phase value updating means comprises:

center phase information generating means for generating center phase information indicative of phase control in a negative direction if said first width is greater than said second width and indicative of phase control in a negative direction if said first width is smaller than said second width; and extracted phase value counting means for counting down said extracted phase value if the center phase information generated by said center phase information generating means is indicative of phase control in the negative direction, and counting up said extracted phase value if the center phase information generated by said center phase information generating means is indicative of phase control in the positive direction.

21. A bit synchronization circuit according to claim 14, wherein said extracted phase value updating means comprises:

center phase information generating means for generating center phase information indicative of phase control in a negative direction if said first width is greater than said second width and indicative of phase control in a negative direction if said first width is smaller than said second width; and extracted phase value counting means for counting down said extracted phase value if the center phase information generated by said center phase information generating means is indicative of phase control in the negative direction, and counting up said extracted phase value if the center phase information generated by said center phase information generating means is indicative of phase control in the positive direction.

* * * * *